(12) United States Patent
Tanaka

(10) Patent No.: US 10,223,768 B2
(45) Date of Patent: Mar. 5, 2019

(54) IMAGE OUTPUT DEVICE COOPERATING WITH AN OUTSIDE IMAGE VISUALIZING DEVICE

(71) Applicant: Masahide Tanaka, Osaka (JP)

(72) Inventor: Masahide Tanaka, Osaka (JP)

(73) Assignee: NL GIKEN INCORPORATED, Osaka (JP)

(*) Notice: Subject to any disclaimer, the term of this patent is extended or adjusted under 35 U.S.C. 154(b) by 70 days.

(21) Appl. No.: 15/166,399

(22) Filed: May 27, 2016

(65) Prior Publication Data

US 2016/0275646 A1   Sep. 22, 2016

Related U.S. Application Data

(63) Continuation of application No. 14/308,826, filed on Jun. 19, 2014, which is a continuation of application No. 12/951,142, filed on Nov. 22, 2010.

(30) Foreign Application Priority Data

Nov. 23, 2009   (JP) .................... 2009-265826

(51) Int. Cl.
| | |
|---|---|
| *G06F 3/14* | (2006.01) |
| *G06T 3/40* | (2006.01) |
| *H04N 1/00* | (2006.01) |
| *G06F 3/041* | (2006.01) |
| *G06T 3/60* | (2006.01) |
| *G09G 5/34* | (2006.01) |
| *H04N 5/225* | (2006.01) |

(52) U.S. Cl.
CPC .............. *G06T 3/40* (2013.01); *G06F 3/0412* (2013.01); *G06F 3/14* (2013.01); *G06T 3/60* (2013.01); *G09G 5/34* (2013.01); *H04N 1/00129* (2013.01); *H04N 1/00196* (2013.01); *H04N 5/225* (2013.01); *G09G 2380/16* (2013.01)

(58) Field of Classification Search
None
See application file for complete search history.

(56) References Cited

U.S. PATENT DOCUMENTS

2008/0278586 A1* 11/2008 Kazami .............. H04N 1/00129
                                                                        348/207.2

* cited by examiner

*Primary Examiner* — Ryan McCulley

(57) ABSTRACT

Digital camera in cooperation with electronic paper calendar of known size comprises monitor smaller than electronic paper calendar and controller to have the monitor display partial picture around a desired point with scale of enlargement to attain size corresponding to that of electronic paper calendar on the basis of calendar size, ratio of picture area to entire calendar and size of digital image data. Digital camera separately stores calendar data, picture data, and event data for flexible combination thereof. Different calendar layouts are selectively prepared for horizontally and vertically long pictures, respectively with differences in picture/calendar ratio and number of months made. Common calendar layout is applied to a plurality of calendars. Even month is arranged on left side and odd month on right side of one calendar layout. Acceleration sensor automatically scrolls partial picture toward the direction opposite to sensed movement with prediction added.

20 Claims, 16 Drawing Sheets

IMAGE OUTPUT DEVICE COOPERATING WITH AN OUTSIDE IMAGE VISUALIZING DEVICE

CROSS REFERENCE TO RELATED APPLICATION

This application is a Continuation Application of U.S. application Ser. No. 14/308,826 filed Jun. 19, 2014, which is a Continuation Application of U.S. application Ser. No. 12/951,142 filed Nov. 22, 2010, herein incorporated by reference in its entirety.

BACKGROUND OF THE INVENTION

1. Field of the Invention

This invention relates to an image output device capable of outputting digital image data for visualization the picture on the basis of the digital image data.

2. Description of the Related Art

In this field of the art, various attempts have been done with respect to image output devices such as digital cameras capable of capturing the digital image data to output for visualization thereof and visualizing devices such as display device or printer capable of displaying or printing the pictures on the basis of the digital image data received from the image output devices.

For example, Japanese Publication No. 1998-108005 proposes to directly connect a printer to a digital camera for the purpose of utilizing the view finder of the digital camera to display the operation screen of the printer for printing process, to display picture image for selecting the format and the picture to be printed in the format, and to carry out the printing in accordance with the selection.

On the other hand, Japanese Publication No. 2006-129371 proposes to display a calendar image including the beginning year and month with selected images put according to the preset initial template. According to the template, the calendar of January, 2005 as the beginning year and month and the calendar of February, 2005 are displayed in a screen.

However, there still exist in this field of art many demands for improvements of improved image output devices.

SUMMARY OF THE INVENTION

Preferred embodiment of this invention provides an image output device capable of cooperating with a predetermined outside image visualizing device for visualizing the picture in a known size. The image output device comprises a storage arranged to store digital image data of a picture to be visualized by the outside image visualizing device, an output portion arranged to output the digital image data stored in the storage to outside of the image output device, a monitor arranged to monitor the picture on the basis of the digital image data to be output from the output portion, the size of the monitor being less than that of the size of the picture visualized by the outside image visualizing device, and a controller arranged to have the monitor display a part of the picture with such a scale of enlargement that the part of the picture is enlarged in the size corresponding to that of the picture to be actually visualized by the outside visualizing device. According to the feature of the embodiment, confirmation of the details on the picture to be used in the cooperating outside image visualizing device can be facilitated in the image output device.

In a detailed design according to the above preferred embodiment, the image output device further comprises an image capturing portion arranged to capture digital image data to be stored in the image storage. A typical example of such an image output device is a digital camera. On the other hand, a typical example of the outside image visualizing device is a digital calendar display.

According to another detailed design according to the above preferred embodiment, the image output device further comprises a pointer arranged to point the part of the picture to be enlarged. This feature is advantageous to confirm the part of the picture in question.

In a still another detailed design according to the above preferred embodiment, the controller is arranged to determine the scale of enlargement on the basis of information of the size of the visualized image and the size of the digital image data. In this respect, the information of the size of the visualized image can be advantageously transmitted from the outside image visualizing device and stored in the image output device.

According to a more detailed design according to the above preferred embodiment, the controller is arranged to determine the scale of enlargement further on the basis of a ratio of area occupied by the picture to the entire area of a predetermined layout visualized by outside image visualizing device. According to this detailed feature of the embodiment, confirmation of the details on the picture can be facilitated with the layout, in which the picture is incorporated, well taken into consideration. A typical example of the layout is a calendar layout with the picture incorporated as a part thereof.

According to another more detailed design according to the above preferred embodiment, the storage is arranged to store calendar data separated from and related with the digital image data, the calendar being composed of the related calendar data and digital image data according to the calendar layout. According to this feature flexible combination between calendar data and the digital image data is possible, which makes it possible to easily substitute the picture in the calendar, for example.

In a still more detailed design according to the above preferred embodiment, the storage is arranged to store event data separated from and related with the calendar data, the calendar being composed of the related calendar data, digital image data and event data according to the calendar layout. According to this feature flexible combination among calendar data, digital image data and event data is possible, which makes it possible to easily carry on a once input fixed event data such as a birthday to the calendars of next year and so on, for example.

According to another detailed design according to the above preferred embodiment, a pair of different ratios are selectively prepared as the ratio of the area occupied by the picture to the entire layout according to corresponding pair of selectively predetermined calendar layouts incorporating one of the horizontally long picture and the vertically long picture, respectively. Thus, suitable layouts for the horizontally long picture and the vertically long picture are realized, respectively.

In a more detailed design according to the above preferred embodiment, one of the pair of selectively predetermined calendar layouts includes a predetermined number of months of calendar different from the number of months included in the other of the pair of calendar layouts. Thus, suitable calendar layouts with each of the horizontally long picture and the vertically long picture suitably incorporated are realized, respectively.

The above design of changing the scale of enlargement is widely applicable in various designs as a general feature that the controller is arranged to determine the scale of enlargement for the horizontally long picture which is different from that for the vertically long picture.

Preferred embodiment of this invention provides another image output device comprising an image storage arranged to store digital image data of a picture, a monitor arranged to monitor the picture on the basis of the digital image data stored in the storage, and a controller arranged to incorporate the picture in a calendar layout, wherein the controller is arranged to display the picture incorporated in the calendar layout with a rotational angle different from that of the same picture alone by 90 degrees on the monitor. According to this design, both a horizontally long picture alone and a vertically long calendar layout with the same horizontally long picture incorporated are effectively displayed in full size on a rectangular monitor of the image output device, for example.

Preferred embodiment of this invention provides another image output device comprising an image storage arranged to store digital image data of a picture, a monitor arranged to monitor the picture on the basis of the digital image data stored in the storage, and a controller arranged to incorporate the picture in a calendar layout, wherein the controller arranged to incorporate a plurality of pictures in a common calendar layout to compose a plurality of different months of calendars, respectively. According to this feature, a plurality of different months of calendars can be easily and effectively created.

Preferred embodiment of this invention provides still another image output device comprising an image storage arranged to store digital image data of a picture, a monitor arranged to monitor the picture on the basis of the digital image data stored in the storage, and a controller arranged to incorporate the picture in a calendar layout, wherein the controller is arranged to incorporate the picture in a calendar including an even month calendar on the left side and an odd month calendar on the right side. Accordingly, a useful two-month calendar with one picture combined can be created.

Preferred embodiment of this invention provides still another image output device comprising an image storage arranged to store digital image data of a picture, a monitor arranged to monitor the picture on the basis of the digital image data stored in the storage, an acceleration sensor, and a controller arranged to have the monitor display a part of the picture with a scale of enlargement, wherein the controller is arranged to automatically scroll the part of the enlarged picture in accordance with the acceleration sensor toward the direction opposite to the movement sensed by the acceleration sensor. Thus, the comprehension of a wider area of the enlarged picture is facilitated due to the retention of brain and persistence of vision.

In a more detailed design according to the above preferred embodiment, the controller is arranged to predict future acceleration on the basis of the change in acceleration of the sensed acceleration to control the scroll on the basis of the acceleration actually sensed by the acceleration sensor with the prediction taken into consideration. Thus, useful scroll is achieved for easy comprehension of a wider area of the enlarged picture.

Other features, elements, arrangements, steps, characteristics and advantages according to this invention will be readily understood from the detailed description of the preferred embodiment in conjunction with the accompanying drawings.

The above description should not be deemed to limit the scope of this invention, which should be properly determined on the basis of the attached claims.

BRIEF DESCRIPTION OF THE DRAWINGS

FIG. 4 is an example of the picture on monitor of image output device, in which FIG. 4(A) shows a basic calendar input window.

FIG. 5 is an example of the picture on monitor of image output device for confirming the details of the picture, in which FIG. 5(A) shows enlarged picture displayed on the monitor in full-screen mode with the longitudinal direction of enlarged picture fitted to that of monitor for achieving the maximum enlargement, suitable rotation of enlarged picture accompanied if necessary for that purpose.

DETAILED DESCRIPTION OF THE PREFERRED EMBODIMENTS

Figure 1:
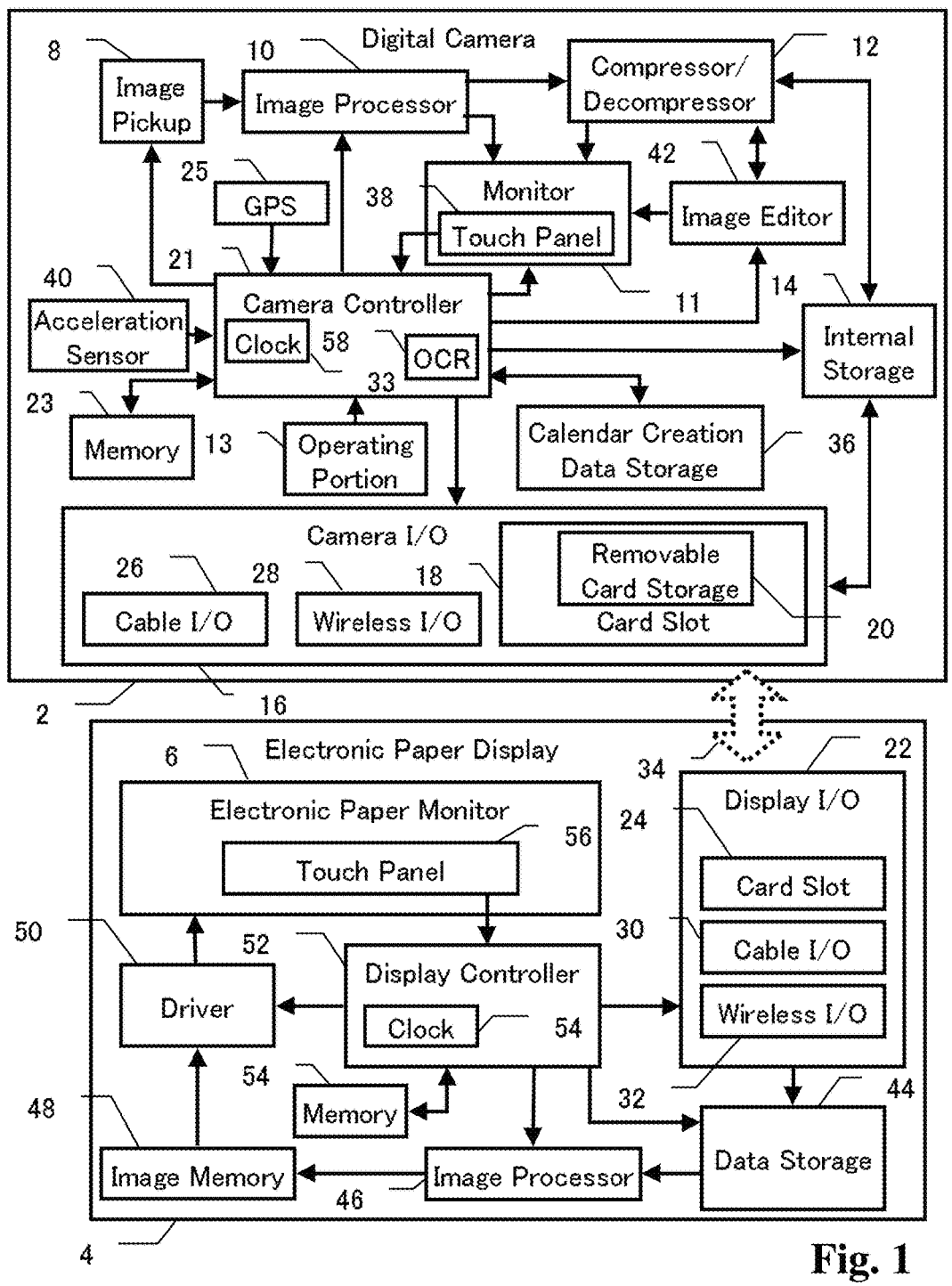
FIG. 1 is a block diagram showing a digital image enjoying system including an image output device and image display device according to the embodiment of this invention.

FIG. 1 is a block diagram showing a digital image enjoying system including an image output device and image display device according to the embodiment of this invention. The embodiment is formed as a combination of digital camera 2 as the image output device and electronic paper display 4 as the image display device, in which electronic paper display 4 displays a calendar with the picture taken by digital camera 2 incorporated therein. Electronic paper display 4 is of an extremely thin structure type capable of being hanged on a wall, and includes large size electronic paper monitor 6 which is rewritable and capable of keep an image with the power shut off. The size of electronic paper monitor display 6 is similar to that of a conventional paper calendar hanged on the wall.

In case of taking a picture for use in creating a calendar, digital camera 2 is aimed at a desired object so that image pickup 8 including a lens and an image sensor faces to the object. The image of the object is captured by image pickup 8 and displayed on monitor 11 by way of image processor 10. Thus, monitor 11 is observed to determine the composition of the object to push a shutter release button in operating portion 13. In response to the shutter release, the image of the object captured by image pickup 8 in compressed at compressor/decompressor 12 by way of image processor 10 to be stored into internal storage 14. According to suitable manners, the compressed image data stored in internal storage 14 is transmitted to removable card storage 20 inserted in card slot 18. Or, alternatively the compressed image data from compressor/decompressor 12 may be directly transmitted to removable card storage 20. The fact that the stored image data is specially taken for the purpose of creating a calendar is marked by means of an operation at operating portion 13, the mark data being attached to the compressed image data for easily distinguishing such a specially taken image data. Camera functions of digital camera 2 including the above mentioned picture taking are controlled by camera controller 21 including a microcomputer. Memory 23 stores programs necessary for camera controller 21 to control the camera function as well as various data necessary for the control. Clock 33 functionally included in camera controller 21 attaches a time stamp to the compressed image data to identify the date and time when the picture was taken. GPS (Global Positioning System) unit 25 attaches position information to the compressed image data to identify the place where the picture was taken.

Removable card storage 20 removed from card slot 18 of camera I/O (Input/output) 16 can be inserted into card slot 24 at display I/O 22 of electronic paper display 4 for inputting the image data into electronic paper display 4 for calendar creation. Or, alternatively, the image data stored in internal storage 14 or removable card storage 20 in card slot 18 can be inputted into electronic paper display 4 through data communication between cable I/O 26 or wireless I/O 28 in camera I/O 16 and cable I/O 30 or wireless I/O 32 in display I/O 22. As will be mentioned later in detail, the data communication between camera I/O and display I/O 22 is by directional to allow data transmission from electronic paper display 4 to digital camera 2. Broken arrow 34 between camera I/O 16 and display I/O 22 shows such a bidirectional data transmission.

Now, the manner of creation and display of calendar are to be explained. Calendar creation data storage 36 stores calendar layout data and date data for a plurality of years, e.g., ten years, including year data, month data and days of the week data with country-by-country holiday data as well as picture data to be arranged in accordance with the calendar layout. Upon creation of a calendar, one of calendar layouts is initially selected by an operation at operating portion 13 among a layout list displayed on monitor 11. In response to the selecting operation from the list, the layout image corresponding to the selected layout is displayed on monitor 11 on the basis of layout data stored in calendar creation data storage 36.

For fitting a picture in the selected calendar layout displayed on monitor 11, operating portion 13 is to be operated to retrieve thumbnails relating to the image data with calendar mark from internal storage 14 or removable card storage 20 for displaying the thumbnails on monitor 11. A desired one of the thumbnails displayed on monitor 11 is to be selected by means of operating portion 13, and the picture related to the selected thumbnail is retrieved from internal storage 14 or removable card storage 20 and displayed on monitor 11 by way of decompression at compressor/decompressor 12. The size of monitor 11 is limited within the contour size of digital camera 2, which means that the largest size of the whole picture capable of being displayed on monitor 11 is limited even if the whole picture is enlarged to its maximum within monitor 11. In other words, the details of the picture is hardly observed by means of whole picture displayed on monitor 11 whereas the size of electronic paper monitor 6 is so large that a digital picture of similar size to that of the picture of the conventional paper calendar can be displayed. Therefore, it is necessary to confirm whether or not the detailed focus and definition in the selected picture is sufficient for display on such an enlargement on electronic paper display 4.

For the above mentioned purpose of details confirmation, calendar creation data storage 36 stores the information of the size of electronic paper monitor 6 peculiar to electronic paper display 4. The scale of enlargement for displaying the picture on monitor 11 with the actual size just the same as that of the picture to be displayed on electronic paper monitor 6 is calculated on the basis of the stored size of electronic paper monitor 6, the ratio of the area occupied by picture to the entire area of the selected calendar layout and the image size of the picture taken and selected. Naturally, the enlarged picture on monitor 11 is a part trimmed from the entire picture. The confirmation process above will be discussed later in more detail.

Monitor 11 includes touch panel 38 for operation. For example, if a desired point of whole picture displayed on monitor 11 is touched, touch panel senses the touched position on displayed picture. In response to the sense of touch panel 38, the enlargement of the picture according to the above mentioned detail confirmation is carried out centered on the touched position. In other words, the enlargement of the picture is easily carried out centered on a portion in question. This manner of enlargement will also be discussed later in more detail.

Acceleration sensor 40 is prepared for causing to scroll the picture to view areas of the enlarged picture not appearing in monitor 11. In other words, if digital camera 2 is moved in parallel with monitor 11, the movement is detected by acceleration sensor 40 to scroll the enlarged picture within monitor 11 toward the direction opposite to the movement of digital camera for example. This means that monitor 11 moves to change the viewable area on the enlarged picture, the absolute position of which substantially kept stationary. Thus, the desired scrolling motion can be easily caused with the stationary entire enlarged picture comprehensive by means of persistence of vision. This manner of scrolling will be discussed later in more detail.

If the picture to be arranged in the selected calendar layout is determined in accordance with the above explained selection and confirmation procedure, image editor 42 combines the selected picture image data from compressor/decompressor 12 with the calendar data which camera controller 21 retrieves from calendar creation data storage 36 to complete calendar image data to be displayed on monitor 11. The completed calendar image data is compressed through compressor/decompressor 12 to be stored in internal storage 14 or removable card storage 20 for transmission to electronic paper display 4 by way of camera I/O 16. By means of combining the picture image data with calendar data including year, month and days of week to complete the calendar image within digital camera 2 in accordance with a similar digital format to that of a simple picture image, even a simple digital photo frame capable of only displaying a transmitted image data as it is or a simple printer capable of only printing a transmitted image data as it is can display or print a completely edited calendar. However, electronic paper display 4 according to the embodiment in FIG. 1 can not only display the completely edited calendar transmitted from digital camera 2, but also can receive from digital camera 2 the uncombined components of the calendar including picture image data, calendar data of year, month and days of week, the calendar layout data as they are to combine the components within electronic paper display 4 by itself. For the purpose of such cooperation with electronic paper display 4, digital camera 2 keeps the uncombined components of the calendar as well as the completed calendar image data. The cooperation between digital camera 2 and electronic paper display 4 above will be discussed later in more detail.

Electronic paper display 4 stores the calendar image data received at display I/O 22 into data storage 44. In the case of data reception by means of inserting removable card storage 20 into card slot 24, removable card storage 20 itself may keep the calendar image data in card slot 24. In the case of data reception in the form of uncombined components of calendar, image processor 46 retrieves the component data from data storage 44 for combining them into the complete calendar image data to transmit it to image memory 48. On the other hand, if the data reception in the form of the complete calendar image data, image processor 46 simply passes the complete calendar data as it is to image memory 48. Driver 50 writes or overwrites the new calendar on electronic paper monitor 6 in response to the calendar image data newly transmitted to image memory 48. Electronic paper monitor 6 keeps the new calendar displayed thereon even if the power is shut off with the new calendar completely written or rewritten.

The above and other functions of electronic paper display 4 are controlled by display controller 52 including a microcomputer. Memory 54 stores programs necessary for display controller 52 to control the functions as well as various data necessary for the control. Clock 54 functionally included in display controller 52 for checking the change in date detects the change in month to cause the rewriting function of display controller 52. In other words, display controller 52 has driver 50 automatically rewrite electronic paper monitor 6 into a new calendar display every new month on the basis of the new month calendar image data retrieved from data storage 44 by way of image processor 46 and image memory 48, the future month calendar image data being previously received from digital camera 2 and stored in data storage 44. Data storage 44 also prepares and stores by itself default future calendar image data for realizing the automatic calendar update in every month in case the custom calendar image data is failed to be previously received from digital camera 2. The automatic update of calendar above will be discussed later in more detail.

Electronic paper monitor 6 includes touch panel 56 for directly inputting comment or noted with hand-written characters or marks by a finger or a touch pen on the displayed calendar. The character or mark sensed by touch panel 56 is to be displayed on electronic paper monitor 6 in such manner that the character or the mark is superimposed as it is on the displayed calendar on electronic paper display. The image of character or mark sensed by touch panel 56 may be transmitted to digital camera 2 for identifying the character or mark by means of OCR (Optical Character Reader) 53 functionally included camera controller 21. In other words, OCR 58 identifies the image data of character or mark to transform it into code data. It should be noted that the image of character or mark is sensed by touch panel 56 according to the embodiment in contrast to that the image of character or mark is sensed by optical image sensor in the case of typical OCR. The code data of character or mark is to be transmitted back to electronic paper display 4 as a data for combining the corresponding character or mark of a standardized font with the calendar image data instead of the hand-written character or mark as it is. Thus, a comment or note such as event information in long term use can be input not only at digital camera 2, but also at electronic paper display 4 directly on the surface of electronic paper monitor 6. The addition of comment or note above will be discussed later in more detail. In any case, the area of electronic paper monitor 6 is so larger that a hand writing of fine character of mark is possible on electronic paper monitor 6, similar hand writing being impossible on monitor 11 of digital camera 2 of remarkably smaller area.

Figure 2:
FIG. 2 is an example of the calendar display on image display device, in which horizontally long picture is incorporated into the calendar layout as a standard case.

FIG. 2 is an example of the calendar display on electronic paper monitor 6 of electronic paper display 4, in which horizontally long picture is incorporated into the calendar layout as a standard case. According to the standard layout in FIG. 2, horizontally long picture 62 is located at the upper half of the calendar layout beneath year indication 64. On the other hand, calendar 66 for two months including month and days of week. According to the embodiment, the calendar image displayed on electronic paper display 6 is rewritten every month. This means that a calendar for two months is possible in such a manner that the days in even month, i.e., October, is located on the left side while the days in odd month, i.e., November, is located on the right side as in FIG. 2. The indication in FIG. 2 is in October. In November, the indication will be automatically rewritten into such a new calendar image that the days in November is shifted to the left side while the days in December are newly displayed on the right side. On the other hand, horizontally long picture 62 may be kept on if the contents of the picture suits for not only October-November season, but also for October-November season. Or alternatively, horizontally long picture 62 may also be changed in accordance with the change from the October-November calendar to the October-November calendar. Further, horizontally long picture 62 can be changed any time in mid-flow of a month.

Among calendar 66, each of Sundays 68 is modified into boldface. Similarly, each of holidays 70 is modified to be encircled for example. The modification of day indications for Sundays and holidays are above automatically carried out every year and month in accordance with the data stored in calendar creation data storage 36. Displayed days in Calendar 66 are capable of being accompanied with additional statement such as fixed event data 72, e.g., personal anniversary data or free event data 74, e.g., schedule of a trip. In the case of the fixed event data 72, the additional statement once input will be carried on the next year and so on. On the contrary, the free event data 74 will not be carried on the next year, but is temporal for the year when the additional statement is input.

Figure 3:
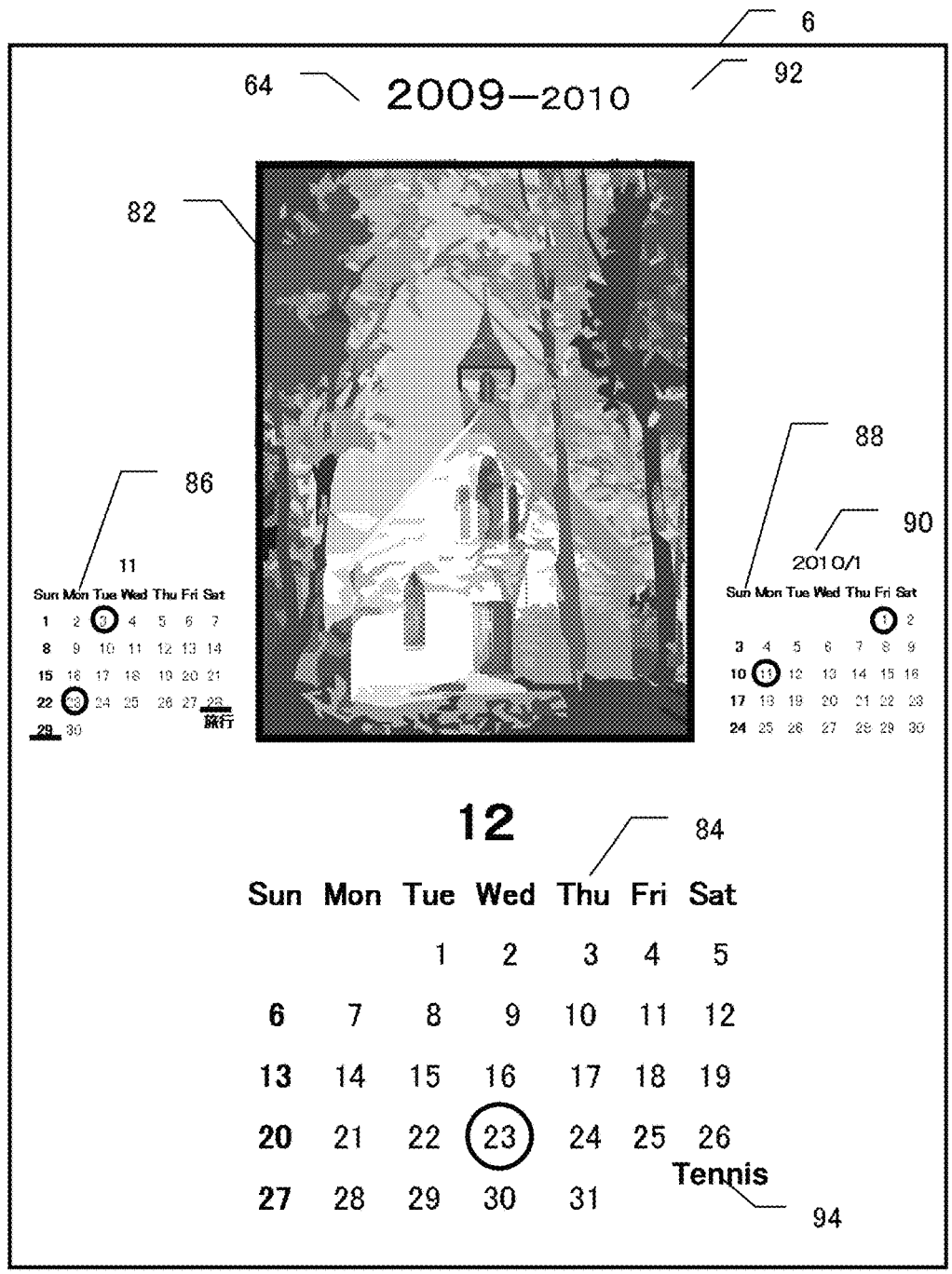
FIG. 3 is another example of the calendar display on image display device.

FIG. 3 is another example of the calendar display on electronic paper monitor 6 of electronic paper display 4, which is basically similar to that in FIG. 2. However, the calendar display in FIG. 3 incorporates vertically long picture 82 into the calendar layout as another standard case. In more detail, vertically long picture 82 is located at the upper half of the calendar layout beneath year indication 64. On the other hand, calendar 84 for one month, e.g., December, including month and days of week. Further, calendar 86 for previous month, e.g., November, is located to the left of vertically long picture 82, while calendar 88 for following month, e.g., January of 2010, is located to the right of vertically long picture 82. In the case of succeeding months cross over years as in FIG. 3, indication of month 90 is automatically accompanied with year indication. Further, in this case, year indication 64 at the top of electronic paper monitor 6 is automatically accompanied with next year indication 92. Hand-written free event data 94 is an example of additional statement input through touch panel 56 in FIG. 1 displayed in the calligraphy sensed on touch panel 56 as it is. Thus, hand-written free event data 94 can be input and indicated at the place of the related day indication in the same manner as the case of writing a comment on a conventional paper calendar.

Figure 4:
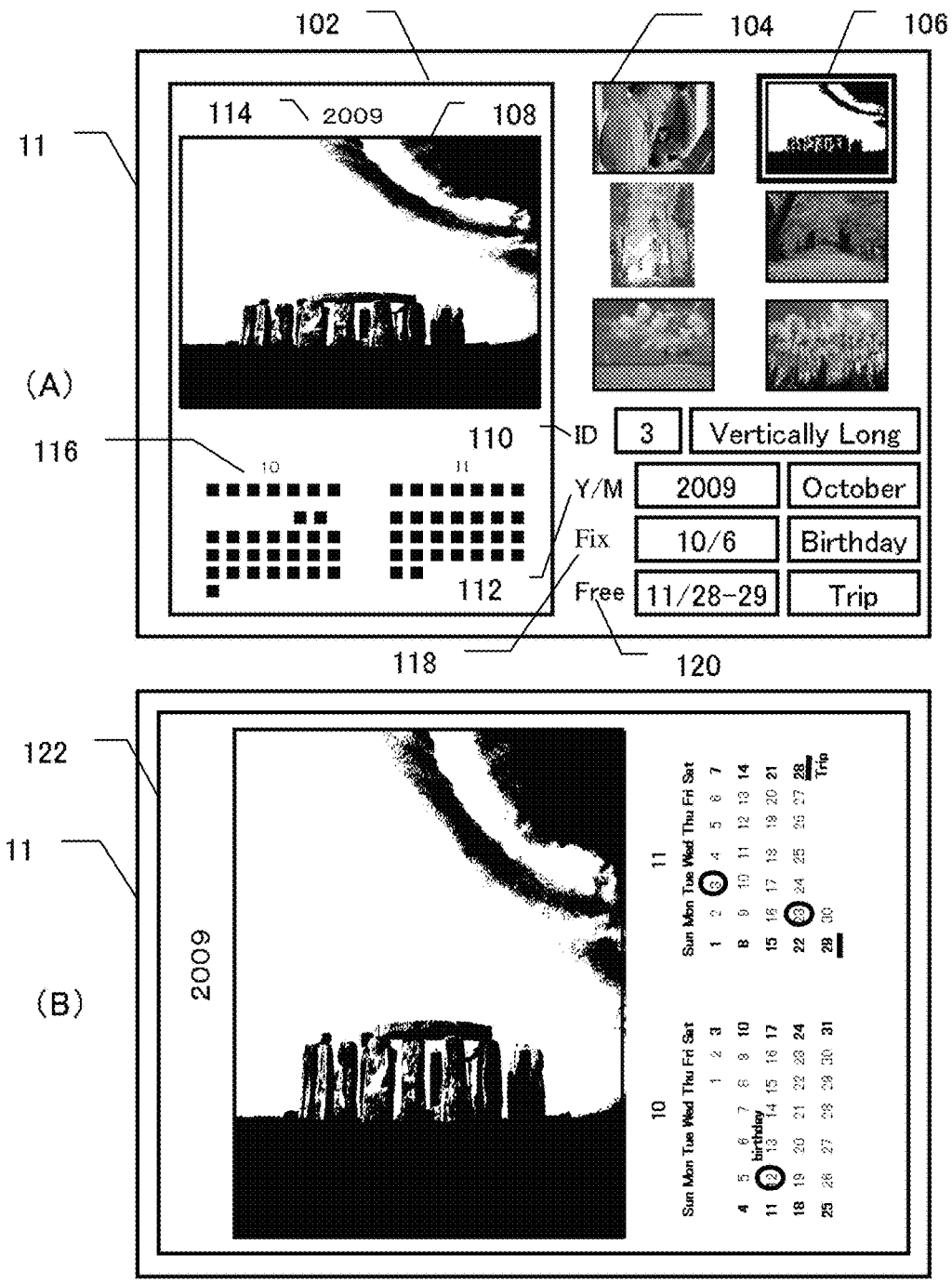

FIG. 4 is an example of the picture on monitor 11 of digital camera 2, in which FIG. 4(A) shows a basic calendar input window. According to the layout of the basic calendar input window in FIG. 4(a), entire calendar layout 102 in the process of creation is located at the left half of the input window. At the upper-right portion of the input window, a group of thumbnails 104 are indicated for selection of a picture to be incorporated in the calendar image, the thumbnail encircled by box cursor 106 being selected and the corresponding picture 108 being temporarily indicated in entire calendar layout 102. At the lower-right portion of the input window, various entry fields are indicated. Namely, ID entry fields 110 show that year calendar type number, e.g., "3" and calendar layout type, e.g., "vertically long" are entered. Year/Month entry fields 112 show that year, e.g., "2009" and month, e.g., "October" are entered. In response to the input at the entry fields, corresponding year indication 114, month/days of week indication 116 appear in entire calendar layout 102. Thus, the calendar image is basically created.

Fixed event data entry fields 118 show that date common to all years, e.g., "October 6" and note for the date, e.g., "birthday" of someone are entered. Similarly, free event data entry fields 120 show that schedule for the year, e.g., "December 28 to 29" and note for the schedule, e.g., "trip" are entered. A plurality of anniversaries or schedules falling within the term, e.g. October to November, identified by Year/Month entry fields 112, are capable of being entered at fixed event data entry fields 118 or free event entry fields 120 one after another which has been entered. All the results of the event entry appear in entire calendar layout 102 at corresponding day indications, respectively.

FIG. 4(B) shows a view on monitor 11 of digital camera 2, in which entire calendar layout 102 in FIG. 4(A) is enlarged in full-screen mode. In this case, enlarged entire calendar layout 122 of vertically long layout is rotated by 90 degrees for fitting the longitudinal direction of the calendar layout to that of monitor 11 for achieving the maximum enlargement. In observing such an enlarged display, digital camera 11 itself is to be rotated back by 90 degrees for erecting the entire calendar layout 122.

Figure 5:
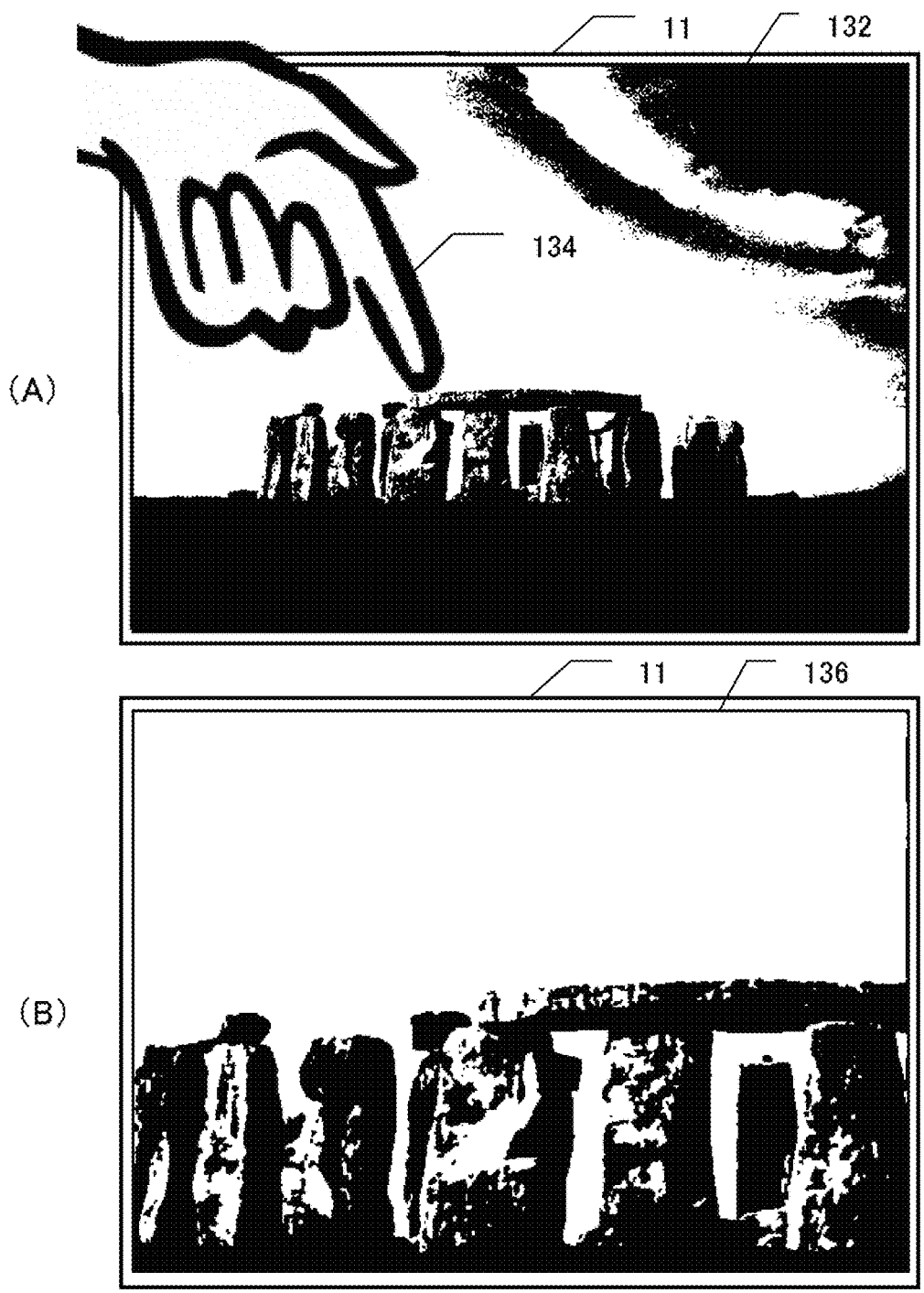

FIG. 5 is an example of the picture on monitor 11 of digital camera 2 for confirming the details of the picture, in which FIG. 5(A) shows enlarged picture 132 displayed on monitor 11 in full-screen mode with the longitudinal direction of enlarged picture 132 fitted to that of monitor 11 for achieving the maximum enlargement, suitable rotation of enlarged picture 132 accompanied if necessary for that purpose. The view in FIG. 5(A) is gotten by a predetermined operation at operating portion 13 in FIG. 1 with the corresponding thumbnail encircled by box cursor 106 in the condition shown in FIG. 4. In case that the confirmation by means of the enlargement in FIG. 5(A) is insufficient, monitor 11 is to be touched by finger 134 at a point in question, and the view shown in FIG. 5(B) results in which enlarged trimming image 136 is displayed with the touched point located at the center of monitor 11 in full-screen mode. As has been already mentioned, the scale of enlargement of trimming image 136 is so calculated as to realize on monitor 11 the actual size of the picture to be displayed on electronic paper monitor 6. The calculation is made on the basis of the size of electronic paper monitor 6, the ratio of the area occupied by picture to the entire area of the selected calendar layout and the image size of the picture to be incorporated into the calendar layout.

Figure 6:
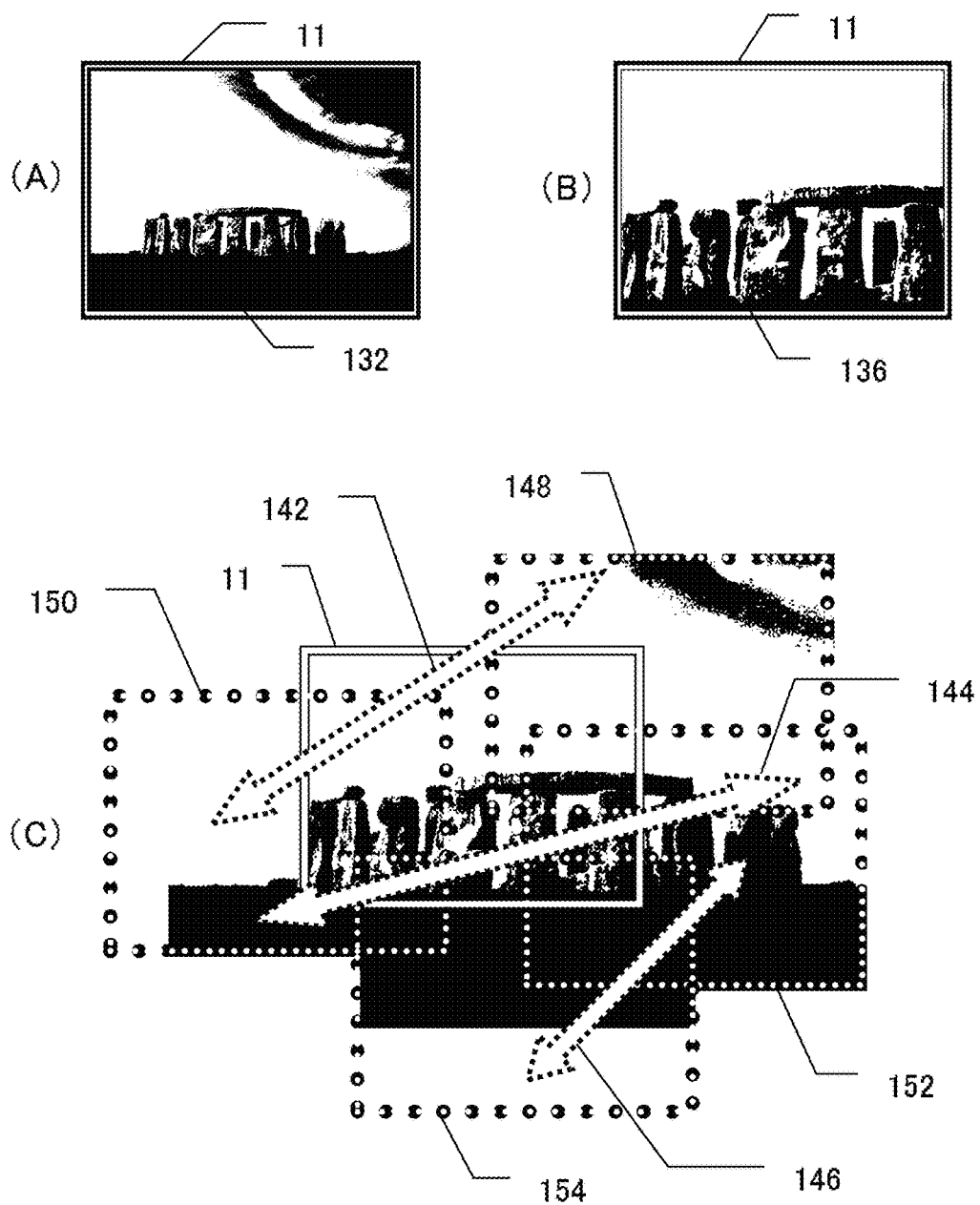
FIG. 6 is an example of the picture on monitor of image output device for explaining in detail the scroll of the enlarged partial image for comprehending the entire image by means of persistence of vision.

FIG. 6 is an example of the picture on monitor 11 of digital camera 2 for explaining in detail the already mentioned scroll of the enlarged partial image for comprehending the entire image by means of persistence of vision. FIG. 6(A) and FIG. 6(B) are identical with FIG. 5(A) and FIG. 5(B), in which entire picture is easily comprehensible but details are unclear in FIG. 6(A), while the part gotten by trimming is clear but entire picture is not comprehensible. FIG. 6(C) shows a way to take care the above antinomy, in which digital camera 2 is moved in parallel with monitor 11. In other words, digital camera 2 is rapidly and repeatedly moved by hand in parallel with the surface of monitor 11 along arrows 142, 144 and 146 for example starting with the state of FIG. 6(B). The movement is detected by acceleration sensor 40 to automatically scroll the enlarged picture within monitor 11 toward the direction opposite to the movement of digital camera 2 to cancel the movement thereof as shown in various positions 148, 150, 152 and 154 of monitor 11 and the enlarged pictures displayed therein, respectively. Thus, as shown in FIG. 6(C), monitor 11 moves to change the viewable area on the enlarged picture, the absolute position of which substantially kept stationary. This means that wider area of the entire enlarged picture is comprehensible by means of persistence of vision.

In more detail, the comprehension of the entire enlarged picture due to the retention of brain and persistence of vision may become easier if the frequency of the repetitions of movement of digital camera 2 is increased within the limit for the scroll speed to follow the movement of digital camera 2. However, some delay from the detection of the movement of digital camera 2 by acceleration sensor 40 to the scroll of picture on monitor 11 is caused by the time necessary for camera controller 21 to process data, which makes it incomplete to keep the absolute position of the picture stationary. To improve the above, camera controller 21 carries out a prediction process on the basis of the detection by acceleration sensor 40 to direct an advanced scroll of the picture with the result of the prediction process incorporated. The prediction process is especially advantageous to predict the turning points of movement on the base of the detection of the speed reduction of the movement. For the prediction process, memory 23 stores data of average characteristic of human hand movement experimentally corrected from many persons.

Figure 7:
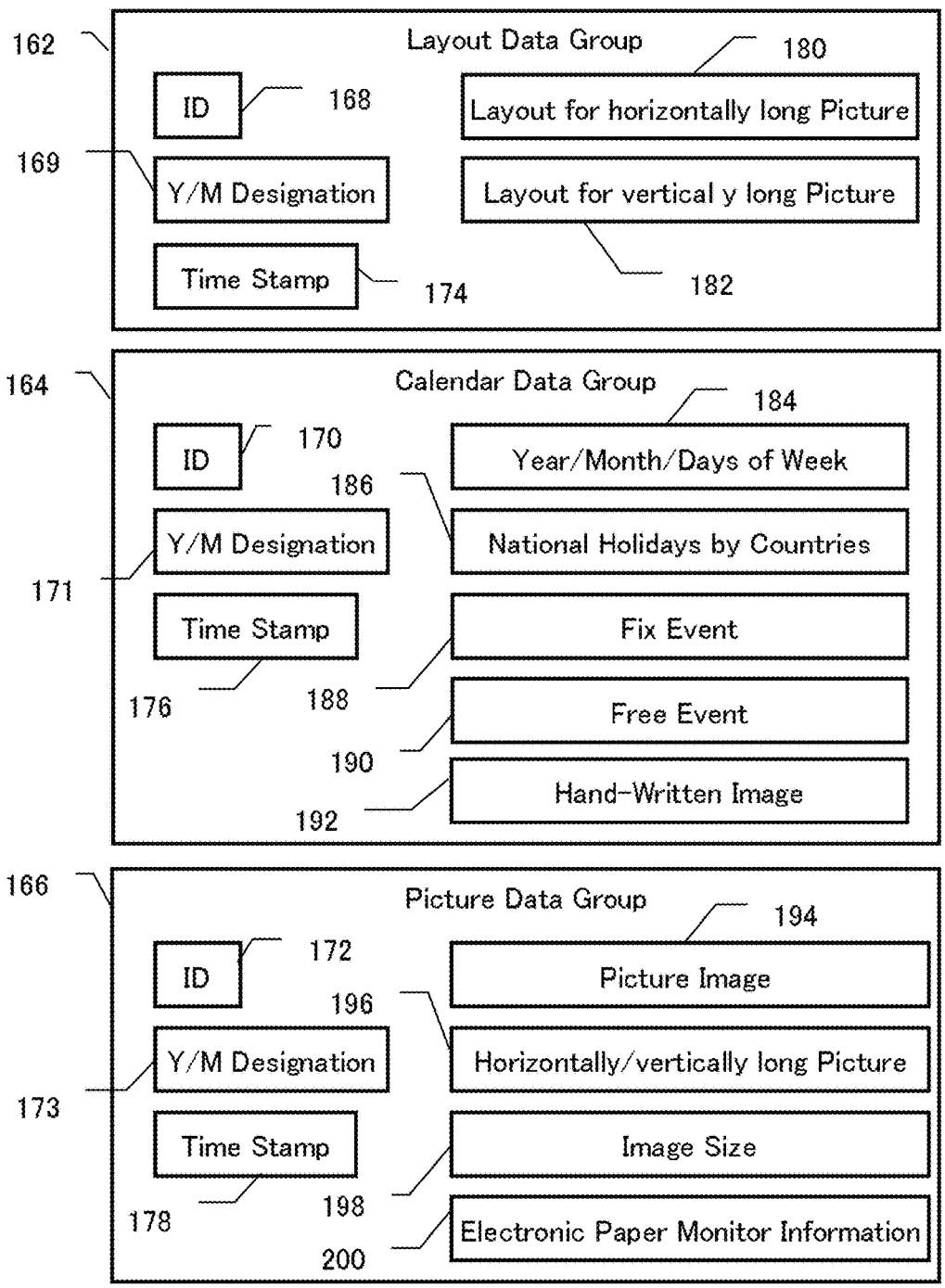
FIG. 7 is a table showing a data format constructing the calendar image, including three groups which can be treated independently from each others, the three groups being layout data group, calendar data group and picture data group.

FIG. 7 is a table showing a data format constructing the calendar image. The data constructing the calendar image is divided into three groups which can be treated independently from each others, the three groups being layout data group 162, calendar data group 164 and picture data group 166. And, all data necessary to complete one calendar for a year are connected with the same calendar ID stored in ID areas 168, 170 and 172. Further, all data necessary to complete one calendar for a month are connected with the same year and month designation stored in Y/M designation areas 169, 171 and 173. By means of the above data format, a calendar image of each month can be constructed and its layout and picture can be changed any time. Due to the change in the layout or picture, a plurality of layout data groups or picture data groups having the same ID and the same year/month designation may be caused. Each of such a plurality of layout data groups or picture data groups are distinguished from the others by the time stamp stored in time stamp areas 174, 176 and 178 since the time stamp is of the time when a new data group is created and differs from others.

Layout data group 162 includes data area 180 storing data of layout for horizontally long picture such as in FIG. 2 and data area 182 storing data of layout for vertically long picture such as in FIG. 3. These data area 180 and 182 are to prepare for a substitution between the layout for horizontally long picture and the layout for vertically long picture under the same ID and the same year/month designation. For example, if only a new vertically long picture is substituted for the horizontally long picture 62 in the calendar for October shown in FIG. 2, the layout is automatically changed into the layout for vertically long picture such as in FIG. 3. In this case, however, year and month are unchanged since the same calendar data group 164 carries on. Therefore, in the new layout as in FIG. 3, calendar of October is shown at calendar 84 for this month in the center of the calendar image. And, calendar of September is shown at calendar 86 for previous month on the left of vertically long picture 82, while calendar of November is shown at calendar 88 for following month on the right of vertically long picture 82. Further, in contrast to FIG. 3, year indication 64 at the top of electronic paper monitor 6 is not accompanied with next year indication 92 since the three months, i.e., September to November, do not cross over two years.

Calendar data group 164 includes data area 184 for storing data of year, month and days of week for three months including the month designated by the data stored in year and month designation area 171 and a pair of months previous and following the designated month. Calendar data group 164 also includes data area 186 for storing national holidays by country in the three months with respect to various registered countries. Further, calendar data group 164 includes data area 188 for fixed event data and data area 190 for free event data each for the three months. Calendar data group 164 still further includes data area 192 for storing hand-written image data gotten through touch panel 56, which is used to add hand-written comment of character or mark to calendar image displayed on electronic paper monitor 6, or is to be transmitted to digital camera 2 for conversion into a code data by OCR 58.

Picture data group 166 includes data area 194 for storing data of picture image taken and selected by digital camera 2 and data area 196 for storing data indicating whether the picture is of horizontally long or vertically long. Calendar data group 164 also includes data area 186 for storing national holidays by country in the three months with respect to various registered countries. Further, picture data group 166 includes data are 198 for storing the image size of the picture stored in area 194 and data area 200 for storing data of electronic paper monitor information which is to be transmitted to digital camera 2 for informing of the size of electronic paper monitor 6. As in the data stored in areas 192 and 200, data for constructing the calendar image include data area for storing data to be transmitted from electronic paper display 4 to digital camera as well as data to be transmitted from digital camera to electronic paper display 4. Thus, the data format in FIG. 7 is used for bidirectional data transmission.

Figure 8:
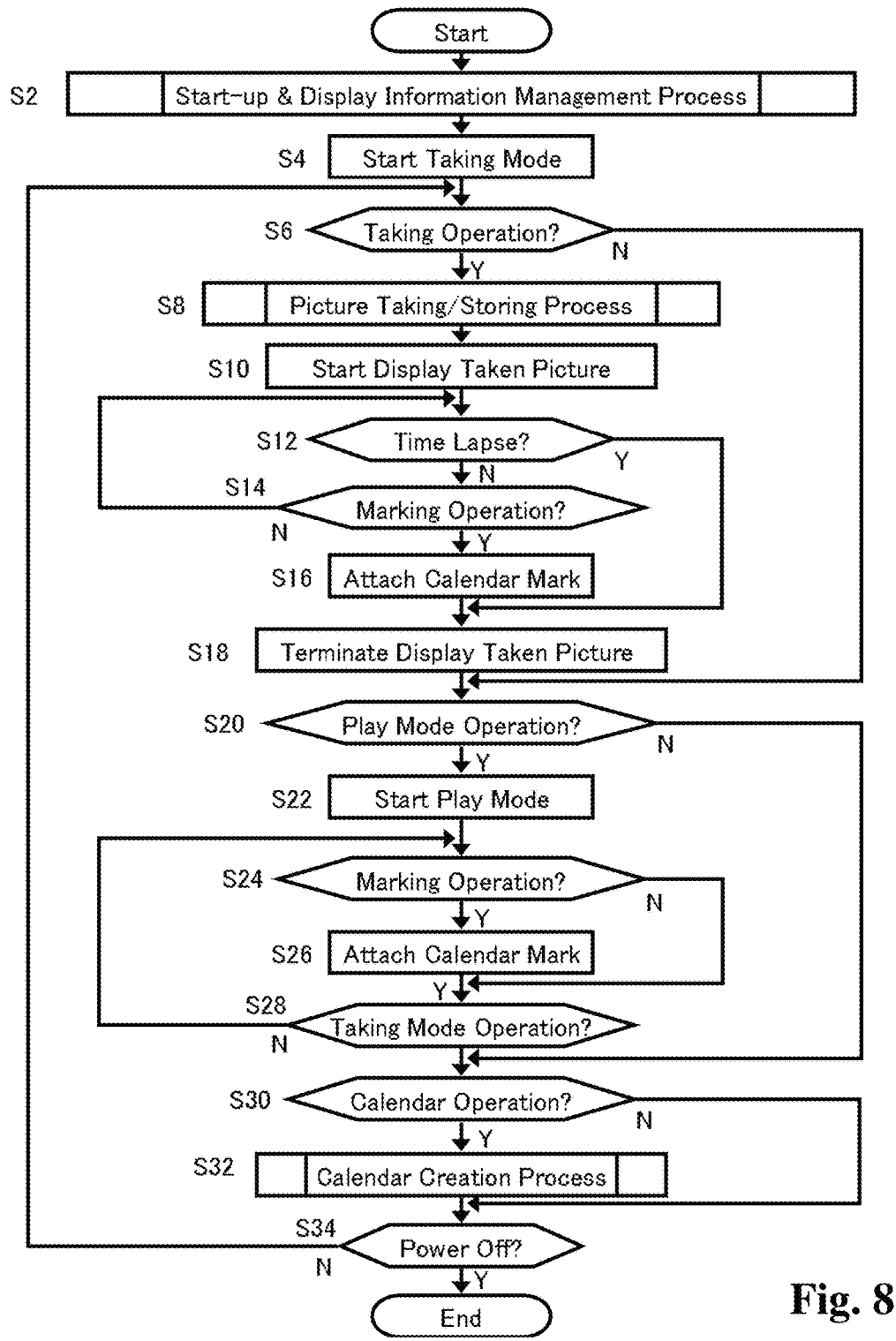
FIG. 8 is a flowchart showing the function carried out by camera controller of the embodiment in FIG. 1.

FIG. 8 is a flowchart showing the function carried out by camera controller 21 of the embodiment in FIG. 1. The flowchart starts when a power switch of digital camera 2 is made on at operating portion 13. If the flow starts, start-up and display information management process is carried out in step S2. The process in step S2 is for beginning various functions of digital camera 2 with initial states thereof, respectively, and for checking whether or not information of the size of electronic paper monitor 6 has been received from electronic paper display 4 and stored in calendar creation data storage 36. The process is step S2 also includes a function of automatically indicating a message on monitor 11 for a predetermined time to inform the user of the necessity for digital camera 2 to get the information though camera I/O 16 if the size of electronic paper monitor 6 has not been stored in calendar creation data storage 36.

In the following step S4, digital camera 2 is automatically set to start with picture taking mode to go to step S4 for checking whether or not the picture taking operation by the shutter release button in operating portion 13. If the picture taking operation is detected in step S6, the flow goes to step S8 to carry out picture taking and storing process. Upon completion of the process in step S8, the flow advances to step S10 to start displaying the taken picture on monitor 11 to go to step S12 for checking whether or not a predetermined time lapses after the start of the taken picture display. If not, the flow goes to step S14 to check whether or not the operation is made at operation portion 13 for marking that the picture is specially taken for the purpose of possibly creating a calendar or inspired by the taken picture on display to possibly use it in creating a calendar. If not, the flow goes back to step S12 to repeat steps S12 and S14 in waiting for the marking operation. On the other hand, if it is detected in step S14 that the marking operation is made, the flow advances to step S16 to attach the calendar mark to the stored image data of the taken picture, the flow then going to step S18 to terminate the display of the taken picture in advance to go to step S20. On the other hand, if the time lapse is detected in step S12 without marking operation within the predetermined time, the flow directly goes to step S18 to terminate the display of the taken picture, the flow then going to step S20.

In step S20, it is checked whether or not a setting operation is made to change the picture taking mode to play mode for retrieving the stored image data and display the taken picture on the retrieved image data. If the play mode setting operation is detected in step S20, the flow advancing to step S22 to start the play mode to go to step S24. In step S24, it is checked whether or not the marking operation is made at operation portion 13 to mark the played picture for possible use in creating a calendar. If the marking operation is detected in step S24 the flow advances to step 26 to attach the calendar mark to the image data corresponding to the picture played on monitor 11, the flow then going to step S28. On the other hand, if the marking operation is not detected in step S24 the flow directly goes to step S28.

In step S28, it is checked whether or not a setting operation is made to change the play mode to the picture taking mode. If the picture taking mode setting operation is detected in step S28, the flow advancing to step S30. On the other hand, if the picture taking mode setting operation is not detected in step S28, the flow goes back to step S24 to repeat steps S24 to S28 for continuing the play mode unless the picture taking mode operation is detected in step S28. Though steps are omitted in FIG. 8, conventional functions in play mode such as displaying of thumbnails and feeding of picture to picture are possible during the repetition of steps S24 to S28. By the way, if the play mode setting operation is not detected in step S20, the flow directly goes to step S30.

In step S30, it is checked whether or not the calendar operation to start creating a calendar is made. If the calendar operation is detected in step S30, the flow goes to step S32 in which calendar creation is carried out. The details of calendar creation process in step S32 will be mentioned later. If the calendar creation process is over, the flow goes to step S34. Further, if the calendar operation is not detected in step S30, the flow directly goes to step S34. In step S34, it is checked whether or not power off operation is made at operating portion 13 to go to the end if the power-off operation is detected. On the other hand, if the power-off operation is not detected, the flow goes back to step S6 to repeat steps S6 to S34 to cope with the change between picture taking mode and play mode as well as the preparation and creation of calendar unless the power off operation is detected.

Figure 9:
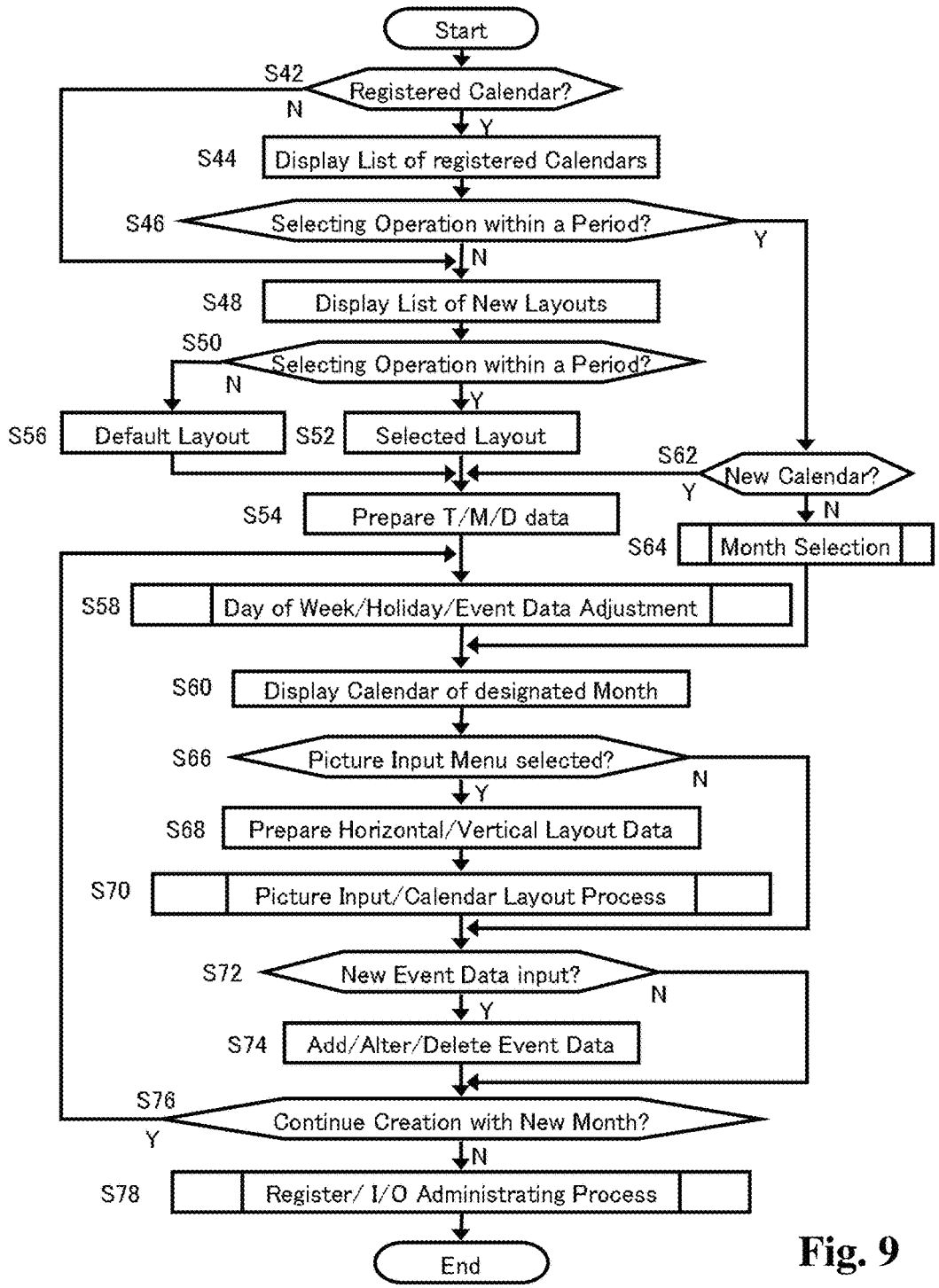
FIG. 9 is a flowchart showing the detailed function of step S32 in FIG. 8.

FIG. 9 is a flowchart showing the detailed function of the calendar creation process in step S32 in FIG. 8. If the flowchart starts, it is checked in step S42 whether or not any calendar has already been registered. If any, the flow goes to step S44 to display list of all the registered calendars on monitor 11. Next, in step S46, it is checked whether or not one of the registered calendar is selected among the list within a predetermined period of time. If not, the flow goes to step S48 to display list of calendar layouts on monitor 11. Further, if no registered calendar is detected in step S42, the flow directly goes to step S48. With the new layout lists displayed, the flow advances to step S50 to check whether or not one of the new calendar layouts is selected among the list within a predetermined period of time. If the selection is detected, the flow goes from step S50 to step S52 to adopt the selected layout to go to step S54. On the other hand, if the selection is not detected in step S50, the flow goes to step S56 to automatically adopt a predetermined default layout to go to step S54.

In step S54, calendar data of year/month/day for one year including the date of operation for creating the calendar is automatically prepared in accordance with the adopted layout. Next, in step S58, day of week and national holidays are adjusted in accordance with the shift or change caused depending on the year. In step S58, the event data, which have been input and capable of being carried on the new calendar, are also adjusted in accordance with the new calendar. In step S58, the adjusted day of week, holidays and event data are related to corresponding days of the new calendar. The process in step S58 will be discussed later in more detail. The process in step S58 is followed by step S60 for displaying the completed calendar for the designated month on monitor 11.

On the other hand, if it is determined in step S46 that one of the registered calendars is selected among the list within a predetermined period of time, the flow goes to step S62 to check whether or not the calendar operation in step S30 was made for creating a new calendar. This check is carried out by means of indicating a corresponding query on monitor 11 for requesting the answer to be manually input by operating portion 13. If the answer informing of a new calendar creation, the flow goes from step S62 to step S54 to carryout the calendar creation in the similar manner to that of the calendar creation with the new layout adopted. In other words, if step S54 follows step S62, a calendar is created with only the registered layout diverted as a template and all the calendar contents newly prepared and applied to the diverted layout.

In contrast to the above, if it is determined in step S62 that the calendar operation in step S30 was not made for creating a new calendar. This means that the calendar operation in step S30 was made for partially modify or correct an existing calendar. The flow in this case accordingly goes form step S62 to step S64 to carry out a process of selecting a month as a target of the modification or correction. According to the process in step S64, manual selection at operation portion 13 is requested to designate the month if the modification or correction relates to a specific month such as in the case of substitution of the picture or change or addition of event data. On the other hand, the month is do selected automatically to include the data of operation if the modification or correction is common to months such as in the case of calendar layout. Step 64 is followed by step S60 to display the selected or designated month.

In step S66, it is checked whether or not the picture input to fill the calendar layout is selected by operating portion 13 as an input item among input menu. If the picture input is selected, the flow goes to step S68 to prepare both the calendar layout for horizontally long picture and the calendar layout for vertically long picture both belonging to the same calendar layout identified by the same ID selected to be filled by the picture. And, the flow goes to step S70 to carry out picture input and calendar layout process, the flow then going to step S72. The process in step S70 will be discussed later in more detail. On the other hand, if it is determined in step S66 that the picture input is not selected by operating portion 13, the flow directly goes to step S72.

In step S72, it is checked whether or not new input operation relating to event data is made at operating portion 13. If the new input operation relating to event data is made, the flow goes to step S74 to add new event data, or to alter or delete existing event data in accordance with the detailed operation at operating portion 13, the flow then going to step S76. On the other hand, if it is determined in step S72 that no new input operation relating to event data is made at operating portion 13, the flow directly goes to step S76.

In step S76, it is checked whether or not the operation to continue the calendar creation with new month designated is made within a predetermined time after the final operation for the preceding calendar creation for another month. If such an operation is detected in step S76, the flow goes back to step S58 to repeat steps from S58, S60 and S66 to S76 every time when new month designation is effectively made. On the other hand, if it is determined in step S76 that no operation is detected after the previous final operation within the predetermined time, the flow goes to step S78 to register the inputs which have been done through the previous steps and to make administration of data input/output, the flow then goes to the end. The process in step S78 will be discussed later in more detail.

Figure 10:
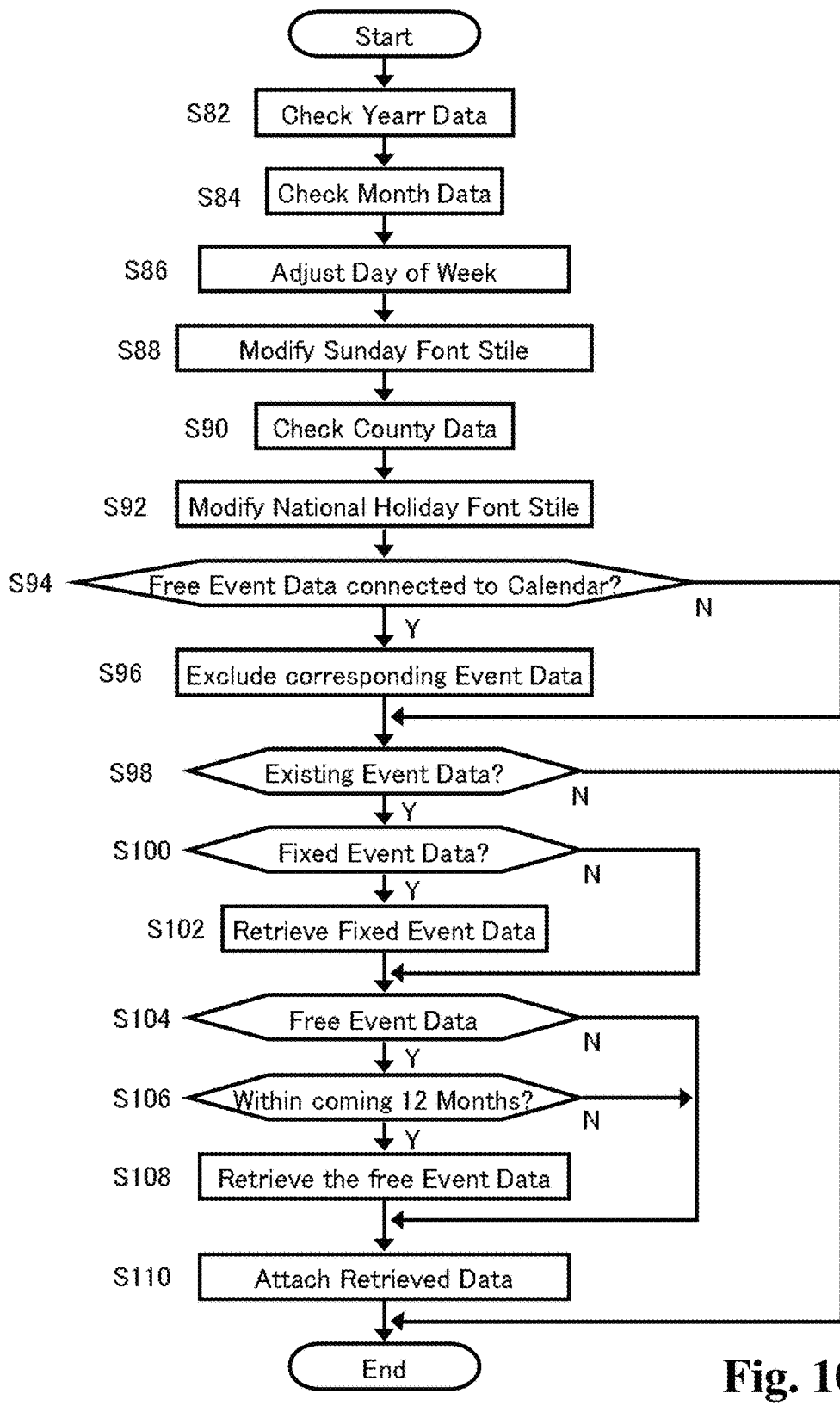
FIG. 10 is a flowchart showing the detailed function step S58 in FIG. 8.

FIG. 10 is a flowchart showing the detailed function of the day of week/holiday/event data adjustment process of step S58 in FIG. 8. If the flow starts, the year is checked in step S82 and the month is checked in step S84 to confirm year and month of the calendar for one month. With respect to the calendar for one month confirmed above, day of week is adjusted in step S86, and the font style of the days corresponding to Sunday are modified in step S88 into bold for example. Further, in step S90, the country data is checked to confirm country where the calendar is used. On the basis of the confirmed country, the font style of the days corresponding to national holidays of the country are modified in step S92 to be encircled for example. According to the functions above, image data of calendars for many years can be created with the shift or change in day of week and national holidays taken into consideration without individually storing image data of year calendar itself for many years.

Next in step S94, it is checked whether or not past free event data is connected to the calendar utilizing in creating the new calendar. This step is to cope with such a case that step S58 is carried out by way of step S62 for creating new calendar with registered calendar layout utilized. If it is determined in step S94 that past free event data is connected to the registered calendar to be utilized, the flow goes to step S96 to exclude the corresponding event data from the registered calendar, the flow then going to step S98. It should be noted that the exclusion of free event data in step S96 does not mean a complete deletion thereof, but a cancellation of relationship between the registered calendar to be utilized and the past free event data which had been connected with the same ID. On the other hand, if it is not determined in step S94 that past free event data is attached to the registered calendar to be utilized, the flow directly goes to step S98.

In step S98, it is checked whether or not any event data is input and stored. If any, the flow goes to step S100 to check whether or not fixed event data is included in the event data storage. If a fixed event data is detected in step S100, the flow goes to step S102 to retrieve the fixed event data to go to step S104. On the other hand, if no fixed event data is detected in step S100, the flow directly goes to step S104. Thus, fixed event data such as the birthday can be automatically carried on every calendar year once the fixed event data in input and stored.

In step S104, it is checked whether or not free event data is included in the event data storage picked up in step S98. If a free event data is detected in step S104, the flow goes to step S106 to check whether or not the free event data is for future event within coming twelve months. If any, the flow goes to step S108 to retrieve the free event data to go to step S110. On the other hand, if no free event data is detected in step S104, the flow directly goes to step S110. Further, if it is determined in step S106 that the free event data is not for future event within coming twelve months, the flow directly goes to step S110. Thus, free event data once input and stored can also be automatically carried on new calendar if the free event data is for future event and the date of the event is within coming twelve months for avoiding a mistake for wrong year. In step A110, the event data retrieved in step S102 and/or step S108 are attached to the new calendar by means of connection by the same ID, the flow then going to the end.

Figure 11:
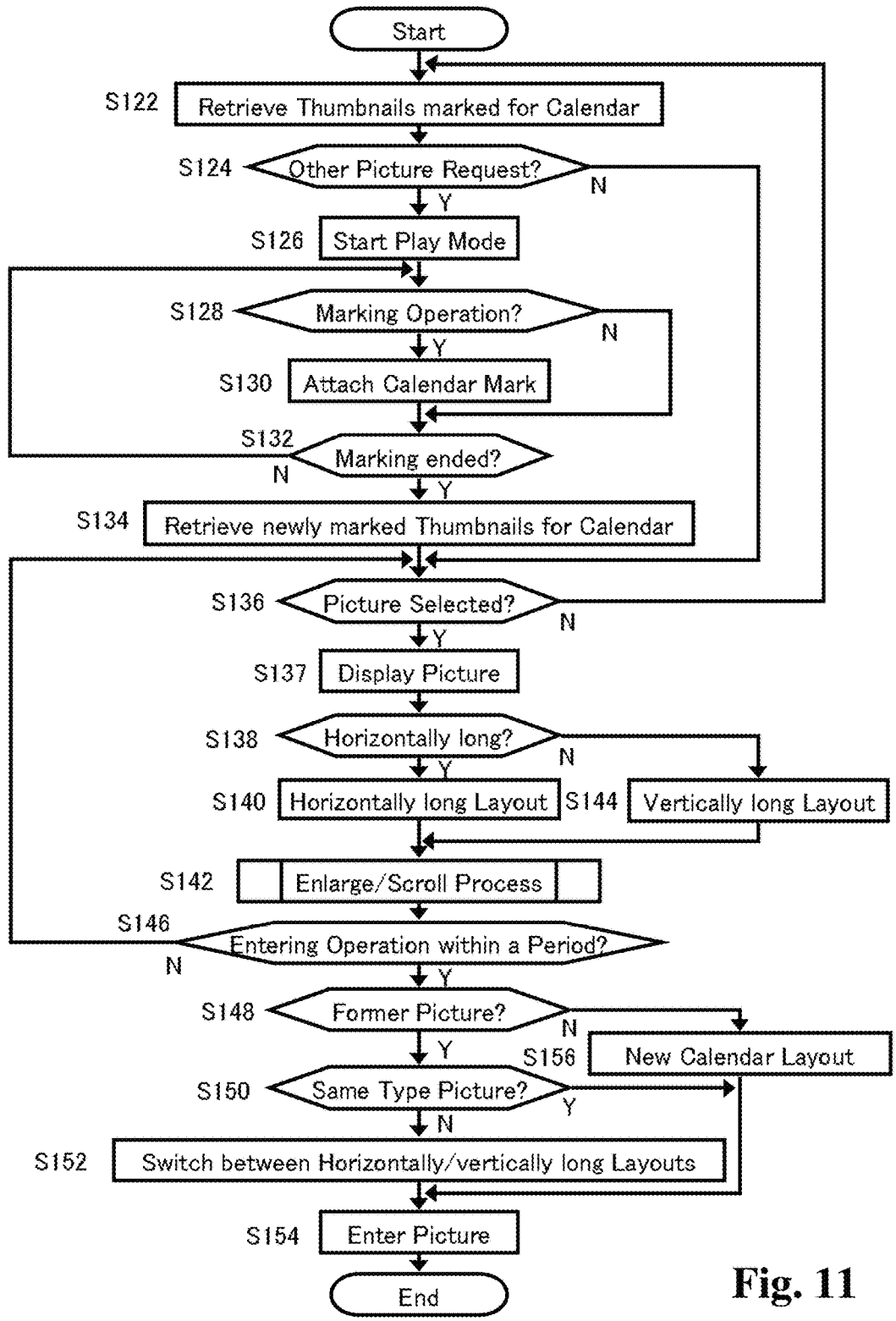
FIG. 11 is a flowchart showing the detailed function of in step S70 in FIG. 9.

FIG. 11 is a flowchart showing the detailed function of the picture input and calendar layout process in step S70 in FIG. 9. If the flow starts, in step S122, thumbnails marked for use in calendar creation are picked up and retrieved for viewing on monitor 11. In this respect, all the retrieved thumbnails can be viewed on monitor 11 by scrolling the window if the number of retrieved thumbnails exceeds the limit capable of being displayed on monitor 11 at once although detailed steps for such a function are omitted in FIG. 11. With the thumbnails displayed on monitor 11, the flow goes to step S124 to check whether or not other picture requesting operation is made at operating portion 13, such an operation being possibly made when other picture is requested to view since no suitable picture for calendar is found among the marked thumbnails. If the operation is detected in step s124, the flow goes to step S126 to start play mode.

Then, the flow goes to step S128 to check whether or not the operation is made at operation portion 13 for marking that the picture is possibly used in creating a calendar. The marking is similar to the marking made in step S14 except for the marking timing. If it is detected in step S128 that the marking operation is made, the flow advances to step S130 to attach the calendar mark to the stored image data, the flow then going to step S132. On the other hand, if no marking operation is detected in step S128, the flow directly goes to step S132. In step S132, it is checked whether or not an operation is made at operating portion 13 to inform that the marking operation is ended. If the marking ending operation is not detected in step S132, the flow goes back to step S128 to continue marking operation by repeating steps S128 to S132 unless the marking ending operation is made.

On the other hand, if the marking ending operation is detected in step S132, the flow goes to step S134 to retrieve thumbnails newly marked through steps 128 to S132 for use in calendar creation for viewing on monitor 11. Next in step S136, it is checked whether or not picture selection among displayed thumbnails is made within a predetermined period of time after the latest operation. By the way, if it is determined in step S124 that other picture requesting operation is not made at operating portion 13, the flow directly goes to step S136 to wait for selection with the thumbnails retrieved in step S122 displayed.

If no picture selecting operation over the predetermined period or time is decided in step S136, the flow goes back to step S122. This makes it possible to search again into thumbnails firstly retrieved in step 122 in case that other picture is considered through steps S124 to S134. Further, the flow begun with step S122 again makes it possible to review again the other picture by reconsider the marking. In the above manner, steps S122 to S136 are repeated to continue the collection and review of possibly usable pictures for calendar creation unless picture selection is detected in step S136.

On the other hand, if picture selecting operation is detected within the predetermined period or time in step S136, the flow goes back to step S137 to display the picture corresponding to the selected thumbnail as in the manner shown in FIG. 5(A). Next in step S138, it is checked whether or not the selected picture is horizontally long. In the case of the horizontally long picture, the flow goes to step S140 to adopt the calendar layout for horizontally long picture from the two types of layout prepared in step S68 in FIG. 9, the flow then going to step S142. On the other hand, if it is determined in step S138 that the selected picture is not horizontally long, the flow goes to step S144 to adopt the calendar layout for vertically long picture from the prepared two types of layout, the flow then also going to step S142. The adoption of the calendar layout of horizontally/vertically long picture is necessary for the next step S142 to determine the automatic enlarging ratio which differs depending on the layout type.

In step S142, enlarge/scroll process is carried out. This process corresponds to the explanation in conjugation with FIG. 5 and FIG. 6. The process in step S142 will be further explained in more detail. Upon completion of the enlarge/scroll process in step S142, the flow goes to step S146 to check whether or not entering operation for finalizing the input of picture is made at operating portion 13 within a period of time after the preceding operation. If no such an operation is detected in step S146 over the predetermined period of time, the flow goes back to step S136 to repeat steps S136 to step S146 unless the entering operation is made. In response to the return to step S136, the display on monitor 11 is reset to the condition of viewing the retrieved thumbnails, which makes it possible to make a selection of another picture. Further, if no picture selection over the predetermined period of time is determined in step S136 in this case, the flow further goes back to step S122, which makes it possible to make the marking operation again for widening the options for picture selection.

On the other hand, if the entering operation is detected within the predetermined period or time in step S146, the flow goes to step S148 to check whether or not the adopted calendar layout includes the former picture attached to the calendar layout. The existence of the former picture to be detected in step S148 means that the selection of the picture this time corresponds to a mere substitution of the picture in an already completed calendar. Thus, if the former picture is detected in step S148, the flow toes to step S150 to check whether or not the newly entered picture is of the same type of the horizontally long picture and the vertically long picture as that of the former picture. If not, the flow goes to step S152 to switch between the calendar layout for horizontally long picture and the calendar layout for vertically long picture, the flow then going to step S154. For example, if the former calendar layout is of the type of FIG. 2 and the new picture is vertically long, the calendar layout is automatically switched to the type of FIG. 3. On the other hand, if it is determined in step S150 that the new and former pictures are of the dame type, the flow directly goes to step S154, in which the substitution of the picture is to be simply made with the former calendar layout carried on. On the other hand, no former picture is detected in step S148, the flow goes to step S156 to use the newly and suitably adopted calendar layout, the flow then going to step S156. In step S154, the picture is finally entered into the suitable calendar layout to go to the end of the flow.

Figure 12:
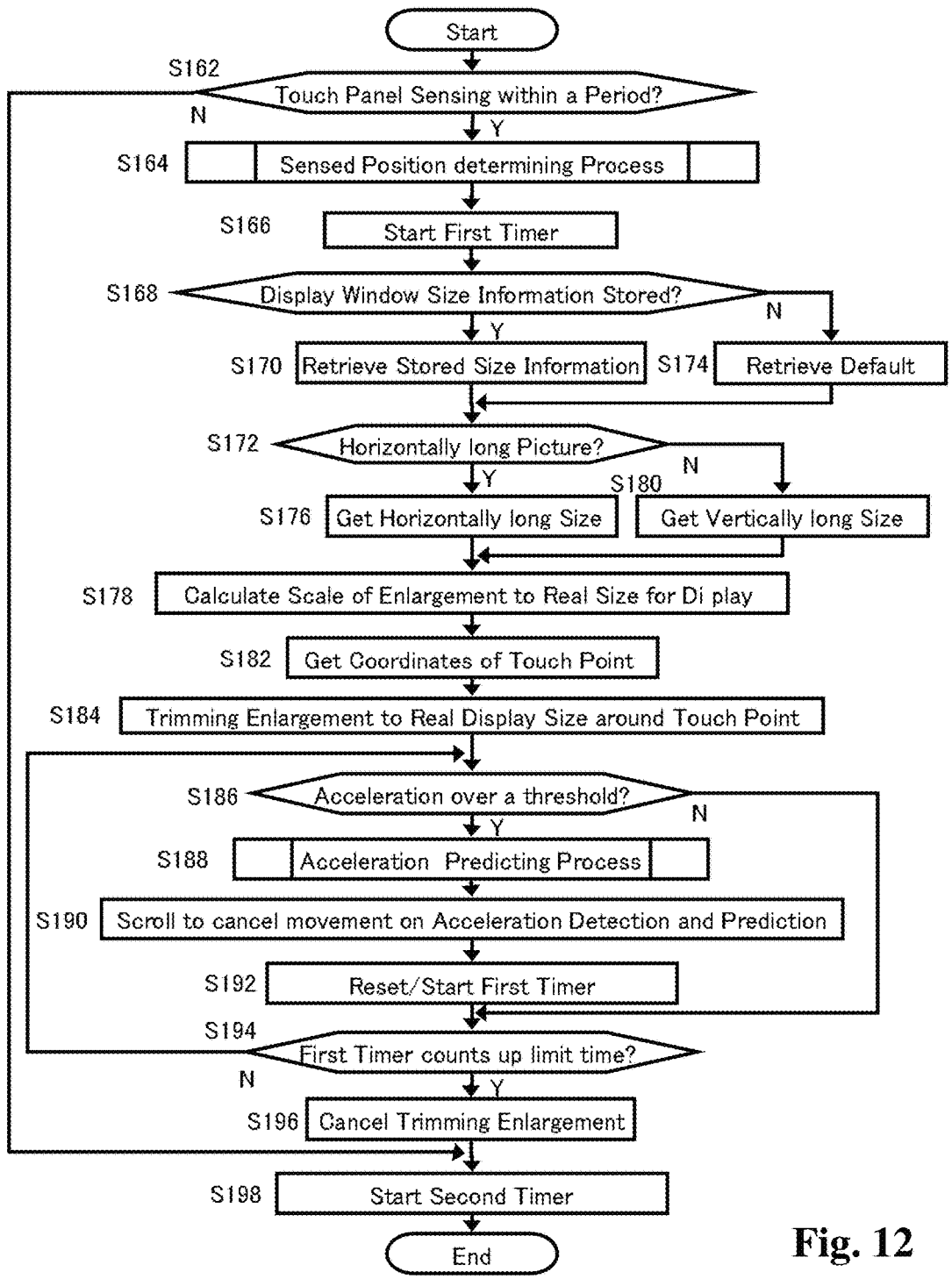
FIG. 12 is a flowchart showing the detailed function of the enlarge/scroll process in step S142 in FIG. 11.

FIG. 12 is a flowchart showing the detailed function of the enlarge/scroll process in step S142 in FIG. 11. If the flow starts, it is checked n step S162 whether or not touch panel 38 sense a touch within a predetermined period of time. If any, the flow goes to step 164 to carry out sensed position determining process. And, in step S166, the first time is directed to start to count the first predetermined time to go to step S168, in which it is checked whether or not information of the size of electronic paper monitor 6 is stored in calendar creation data storage 36. If the size information is stored, the flow goes to step S172 to retrieve the stored size information to go to step S172. On the other hand, it is not determined in step S168 that size information of electronic paper monitor 6 is stored in calendar creation data storage 36, the flow goes to step S174 to retrieve predetermined default size information of a standard display monitor prepared in calendar creation data storage to go to step S172. It should be noted that step S174 is not to realize an enlargement of image on monitor 11 with the actual size of the picture to be displayed on electronic paper monitor 6, but to prefer the advancement of the flow with some image size information to a freezing of the flow for seeking size information of electronic paper monitor 6.

In step S172, it is checked whether or not the displayed picture is horizontally long. In the case of horizontally long picture, the flow goes to step S176 to get the size of horizontally long image to be displayed on electronic paper monitor 6 in accordance with the calendar layout for horizontally long picture to go to step S178. On the other hand, if it is not determined in step S172 that the displayed picture is horizontally long, it means that the picture is vertically long. In this case, the flow goes from step S172 to step S180 to get the size of vertically long image to be displayed on electronic paper monitor 6 in accordance with the calendar layout for vertically long picture to go to step S178. The size of horizontally or vertically long picture above is gotten by the size of electronic paper monitor 6 and the calendar layout for horizontally or vertically long picture.

In step S178, the scale of enlargement for displaying the picture on monitor 11 with the actual size just the same as that of the picture to be displayed on electronic paper monitor 6 is calculated on the basis of the size of horizontally or vertically long picture to be displayed on electronic paper monitor 6 according to the calendar layout gotten in step S176 or step S180 and the image size of the picture taken. As has been pointed out above, in the case that step S172 follows step S174, the scale of enlargement for actual size on monitor 6 is not calculated in step S178, but a scale of enlargement in calculated on the basis of the default size information. Next in step S182, the coordinate of the touched point determined in sensed position determining process in step S164 is gotten to go to step S184, in which the trimming enlargement to the real display size on electronic paper monitor 6 around the touch point is realized. Thus, the display in FIG. 5(A) is change to the display in FIG. 5(B) in response to the touch on electronic paper monitor 6 provided with touch panel 56.

The succeeding steps S186 to S194 relate to the function of scrolling the picture enlarged with trimming in step S184 according to the manner as in FIG. 6(C). Firstly in step S186, it is checked whether or not acceleration sensor 40 detects acceleration over a predetermined threshold. If the acceleration is detected, the flow goes to step S188 for carrying out acceleration predicting process for predict future acceleration on the basis of the change in acceleration actually detection by acceleration sensor 40. As has been already mentioned, the prediction process is especially advantageous to predict the turning points of movement on the base of the detection of the speed reduction of the movement. Next in step S190, the scroll is carried out toward the direction opposite to the movement of digital camera 2 to cancel the movement thereof on the basis of the acceleration actually detection by acceleration sensor 40 and the prediction by the function in step S188. Further, in step S192, the first time is reset and restarted to go to step S194. On the other hand, if no acceleration over the threshold is detected in step S186, the flow directly goes to step S194.

In step S194, it is checked whether or not the first timer has counted up the first limit time. If not, the flow goes back to step S186 to repeat steps S186 to 194 to continue the scroll operation unless the first timer does not count up the first limit time. Since the first timer is reset and restarted in step S192 every time when new acceleration is detected in step 186, the scrolling function by means of the repetition of steps S186 to S194 continues as long as digital camera 2 is being moved. On the other hand, if it is detected in step S194 that the first timer has counted up the first limit time, the flow goes to step S196 the trimming enlargement to return the display as in FIG. 6(A). And, in succeeding step S198 the second time is started, the flow then going to the end. By the way, if it is not determined in Step S162 that touch panel 38 senses a touch within a predetermined period of time, the flow directly goes to step S198. The second limit time counted by the second timer started in step S198 corresponds to the period of time in the check in step S146 in FIG. 11 within which it is checked whether or not the entering operation is made. In other words, the display as in FIG. 6(A) continues during the period of time for waiting for the entering operation in accordance with the function of step S146 in FIG. 11.

Figure 13:
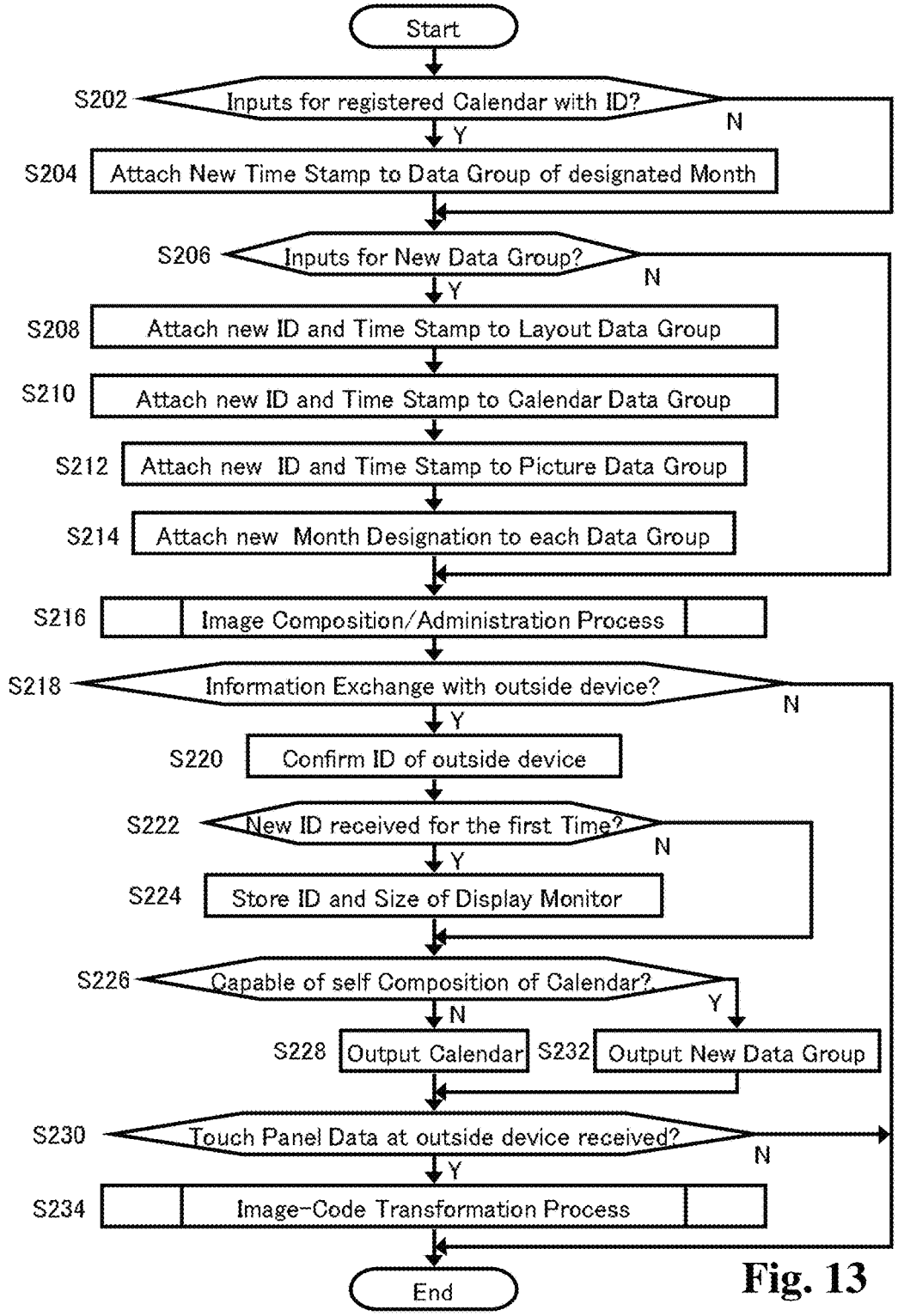
FIG. 13 is a flowchart showing the detailed function of step S78 in FIG. 9.

FIG. 13 is a flowchart showing the detailed function of the input registering process and the data input/output administrating process both carried out in step S78 in FIG. 9. If the flow starts, it is checked in step S202 whether or not the inputs which have been done through the previous steps are for modify or correct an existing calendar already registered with an ID. If the inputs are for an already registered calendar, the flow goes to step S204 to attach new time stamp to the registered data group of the identified month to go to step S206. On the other hand, if it is determined in step S202 that the inputs are not for an already registered calendar, the flow directly goes to step S206.

In step S206, it is checked whether or not the inputs which have been done through the previous steps are for newly created data group. If inputs for newly created data group, the flow goes to step S208 to attach new ID and new time stamp to the newly created layout data group. Similarly, new ID and new time stamp are attached to the newly created calendar data group in step S210. New ID and new time stamp are also attached to the newly created picture data group in step S212. Further, in step S214, new month designation is attached to each data group, the flow then going to step S216.

In step S216, image composition and administration process is carried out. In other words, the process in step S216 includes decision on necessity of image composition and execution of the image composition if necessary. The process in step S216 also includes administration of each data group incorporated into the image composition and of the completed image composition data which has been transmitted to outside device. The details of the image composition and administration process will be further explained later. On the other hand, if it is not determined in step S206 that inputs which have been done through the previous steps are for newly created data group, the flow directly goes to step S216.

The succeeding steps led by step S218 relate to administration of information exchange with outside devices. The outside device includes not only sophisticated ones such as electronic paper display 4 in FIG. 1 which are capable of composing a calendar image by itself on the basis of a plurality of divided data groups, but also simplified ones such as digital photo frames or digital printers capable of simply outputting display image or print on the basis of data transmitted in the form of completed image.

Firstly in step S218, it is checked whether or not any information exchange with an outside device is carried out through camera I/O 16. If any, the flow goes to step S220 to confirm ID of the outside device in communication on the basis of received data from the outside device. And, in step S222, it is checked whether or not the device ID is newly received from the outside device for the first time. In the case of new ID, the flow goes to step S224 to newly store the received ID and size of display monitor of the outside device into calendar creation data storage 36, the flow then going to step S226. On the other hand, if it is not determined that the device ID is newly received from the outside device for the first time, the flow directly goes to step S226 since the device ID and size of display monitor of the outside device have been already stored in calendar creation data storage 36.

In step S226, it is checked whether or not the outside device is of the sophisticated type capable of composing a calendar image by itself on the basis of a plurality of divided data groups. If not, the flow goes to step S228 to output complete calendar data created inside digital camera 2, the flow then going to step S230. On the other hand, if it is confirmed in step S226 that the outside device is of the sophisticated type capable of composing a calendar image by itself, the flow goes to step S232 to output only new data group necessary for newly composing or partially modifying the calendar, the flow then going to step S230. In the case of creating an entirely new calendar, all the data groups as in FIG. 7 are output in step S232 for composition within the outside device.

In step S230, it is checked whether or not image data gotten by touch panel of the outside device is received. A typical example of such image data is the hand-written character or mark to indicate an event on calendar sensed at touch panel 56 of electronic paper display 4 in FIG. 1. If it is detected in step S230 that any touch panel data at output device is received, the plow goes to step S234 to carryout image-code transformation process, in which the received image of character or mark is identified by OCR 53 functionally included camera controller 21 to transform it into code data indicative of the character or mark. The process in step S234 further include a function to input the code data as an event data to be added to calendar data group, the flow then going to the end. In the process in step S234, coordinates data at which the hand-writing is made on touch panel 56 received along with the hand-written image itself is utilized to identify the date on calendar where the event data is input. On the other hand, if it is not detected in step S230 that any touch panel data is received, the flow directly goes to the end. If it is not detected in step S218 that any information exchange with an outside device is carried out, the flow also directly goes to the end.

Figure 14:
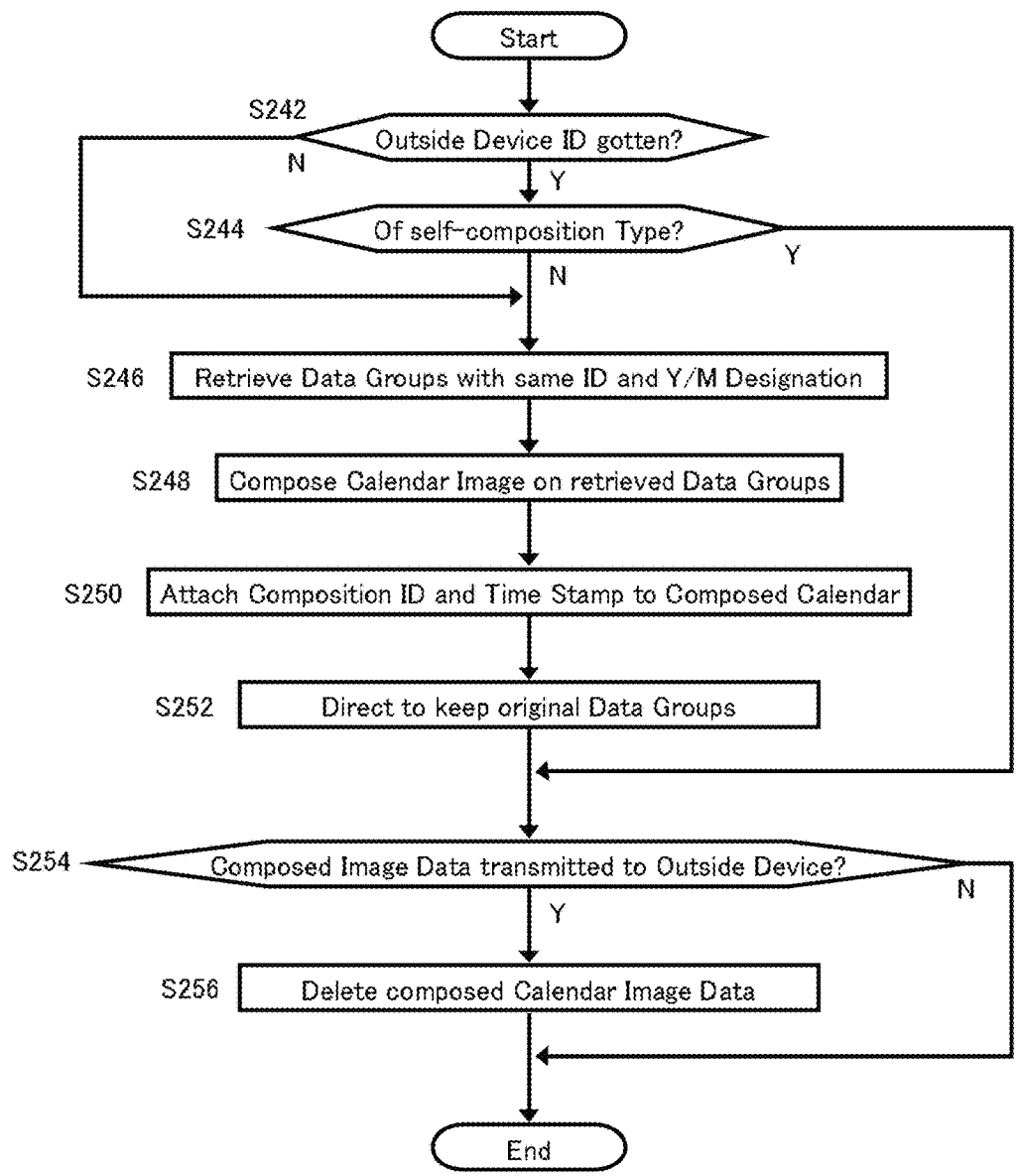
FIG. 14 is a flowchart showing the detailed function of step S216 in FIG. 13.

FIG. 14 is a flowchart showing the detailed function of the image composition/Administration process in step S216 in FIG. 13. If the flow starts, it is checked in step S242 whether or not device ID of outside device, to which the data for calendar is transmitted, has been gotten. If the device ID of outside device has been gotten, the flow goes to step S244 to check whether or not the attribute of outside device identified by the device ID shows that the outside device is of a type capable of composing a calendar image by itself on the basis of a plurality of divided data groups. If it is determined in step S244 that the outside device is not of the type capable of composing a calendar image by itself, the flow goes to step S246. If it is determined in step S242 that ID of outside device has not been gotten yet, the flow also goes to step S246. Thus, steps led by steps S246 are prepared for coping with the above cases that the outside device is possibly of the simplified type capable of only outputting display image or print on the basis of transmitted image data which has to have been completed on the side of digital camera 2.

In step S246, all data groups with the same calendar ID and the same year/month designation are retrieved to constitute a calendar of one month. In other words, a set of one layout data group, one calendar data group and one picture data group for a specific one month are retrieved. In doing so, if a plurality of the same type of groups, e.g., a plurality of picture data groups, with the same calendar ID and the same year/month designation exist, only one data group with the newest time stamp is selected among them as the type of data group, e.g., the picture data group. Next in step S248, a calendar image for a month corresponding to the designated year and month is composed on the basis of the set of the retrieved data groups with selection made if necessary, the composed image data is kept for transmission to the outside device. In step S250, a composition ID and the time stamp showing the composition time are attached to the calendar image composed in step S248. Further, in step S252, it is directed to also keep each of the original data groups consisting of the composed image data for the purpose of at least a part of them in the possible future modification of the composed image, which is to be newly composed on the basis of unchanged group data and substituted group data, the flow then going to step S254. On the other hand, if it is decided in step S244 that the outside device is of the type capable of composing a calendar image by itself, the flow directly goes to step S246 since there is no necessity for digital camera 2 to compose the calendar image.

In step S254, it is checked whether or not such a composed calendar image data exists that has been actually transmitted to the outside device identified by device ID without fail. If any, the composed calendar image data is deleted in step S256 to go to the end of the flow. This means that the calendar image data, which was composed in digital camera 2 for transmission to the target outside device, is to be deleted if it served the purpose. Even if the composed data is deleted, the reconstruction thereof on necessity is possible since the original data groups are kept according to the direction in step S252. On the contrary, if it is determined in step S254 that no such a composed calendar image data exists that has been actually transmitted to the outside device identified by device ID, the flow instantly goes to the end of the flow.

Figure 15:
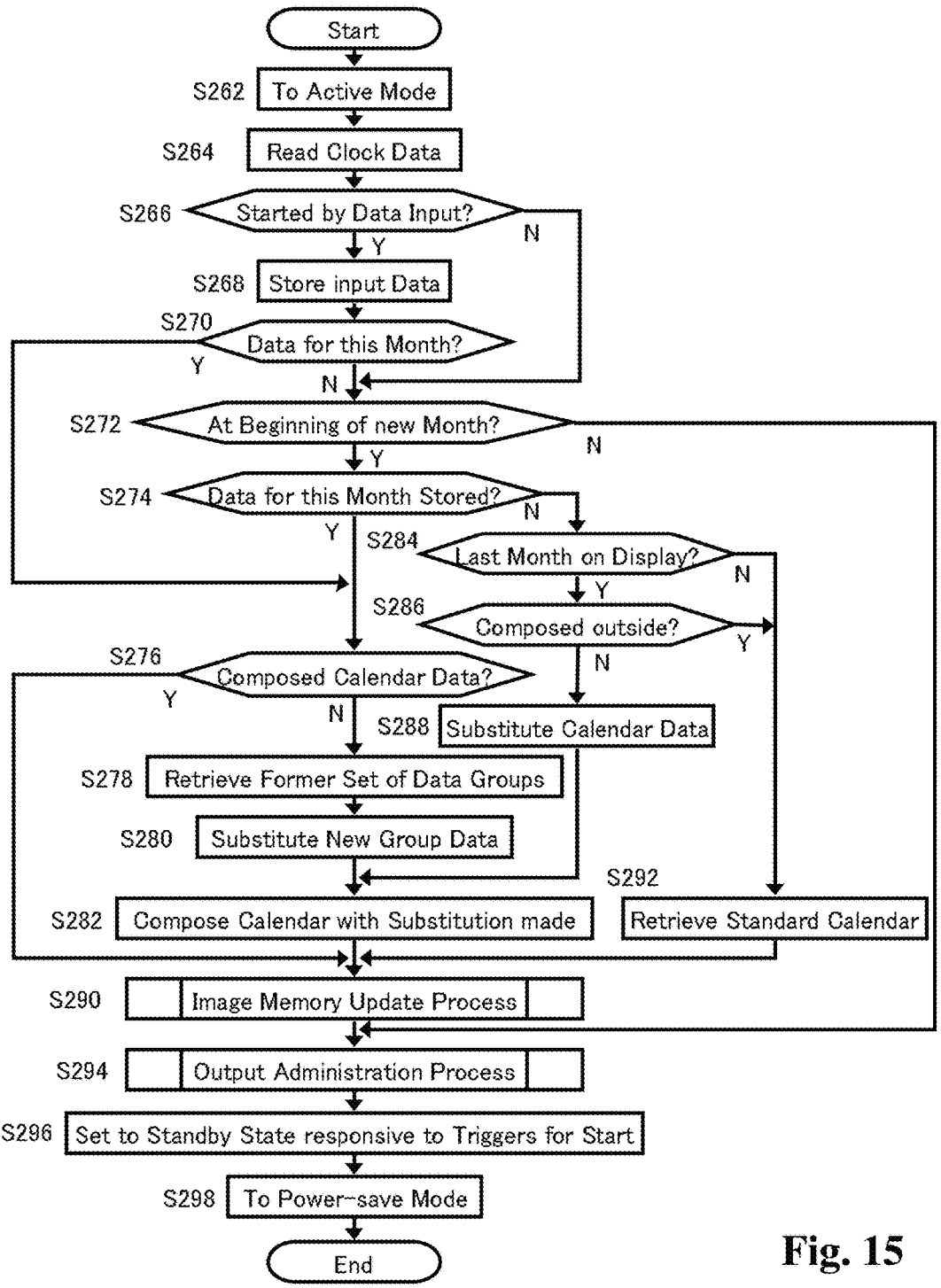
FIG. 15 is a flowchart showing the function carried out by display controller in electronic paper display of the embodiment in FIG. 1.

FIG. 15 is a flowchart showing the function carried out by display controller 52 in electronic paper display 4 of the embodiment in FIG. 1. The flowchart starts in response to an operation to initiate communication with digital camera 2 by way of display I/O 22 such as insertion of removable card storage 20 into card slot 24, or insertion of a cable into cable I/O 30, or a manual operation to initiate wireless communication by wireless I/O 32. The flowchart also starts in response to a hand-writing input at touch panel 56 or at the beginning of the next month on the basis of clock 54. The above mentioned operation to initiate communication with digital camera 2 is mainly for transmit data from digital camera 2 to electronic paper display 4. However, the flowchart starts in response to any purpose of operation to start communication including the data transmission from electronic paper display 4 to digital camera 2. For facilitating the above mentioned start of the flowchart, electronic paper display 4 in power-save mode is in standby state capable of responding to various types of above mentioned trigger to start the flowchart.

If the flow starts, electronic paper display 4 is switched from the power-save mode to active mode in step S262. And, in step S264, it is directed to read clock data to go to step S266. In step S266, it is checked whether or not the flow has been started in response to data input caused by the initiation of communication with digital camera 2. If it is determined in step S266 that the flow has been started in response to data input, the flow goes to step S268 to store the input data which has started the flowchart. In the succeeding step S270, it is checked whether or not the data relates to this month. If not, the flow goes to step S272. If it is not determined in step S266 that the flow has been started in response to data input caused by the initiation of communication with digital camera 2, the flow also goes to step S272.

In step S272, it is checked whether or not the flow has been started at the beginning of the next month on the basis of clock 54. In the case of flow starting at the beginning of the next month, the flow goes to step S274 to check whether or not data of this month is stored. If any, the flow goes to step S276. If it is determined in step S270 that the stored data relates to this month, the flow also goes to step S276. In step S276, it is checked whether or not the stored data relating to this month is a composed calendar data. If not, the flow goes to steps led by step S278 to compose a calendar in electronic paper display 4 by itself.

In step S278, the set of layout data group, calendar data group and picture data group with the same calendar ID and the designation of this month are retrieved. It should be noted that the retrieved set of data groups are former ones, i.e. the original data groups of the currently displayed calendar image before modification, or of the calendar image of the last month at the beginning of the new month. In the succeeding step S280, the new group data is substituted for the corresponding one of the retrieved set of data groups. The new data group above means the newly input data stored in step S268 in the case of modification of the currently displayed calendar. Or, the new data group above means the data for this month which is confirmed in step S274 to be stored in the case of calendar change at the beginning of new month. In step S282, the new calendar image is composed on the set of data groups with the substitution made.

On the other hand, if it is determined in step S274 that data of this month is not stored at the beginning of the new month detected in the preceding step, the flow goes to step S284 to check whether or not the calendar of last month is still on display. If last month on display, the flow goes to step S286 to check whether or not the calendar now on display has been composed outside and received. If not, it means that the calendar image now on display has been composed within electronic paper display 4 which keeps original data groups constituting the calendar, the kept original data groups being utilizable in electronic paper display 4 to modify the last month calendar into the new month calendar. Thus, the flow goes from step S286 to step S288 to substitute new calendar data group for last month calendar data group with layout data group and picture data group taken over, the flow then going to step S282 to compose the new calendar image.

In step S290, which follows step S282, image memory update process is carried out to update the image data in image memory 48 with the newly composed calendar image data to change the calendar display on electronic paper monitor 6. By the way, if it is determined in step S284 that the calendar of last month is not displayed, the flow goes to step S292. If it is determined in step S286 that the calendar now on display has been composed outside and received, the flow also goes to step S292. Since electronic paper display 4 by itself cannot compose the calendar image date in both cases above, step S292 is prepared to retrieve a predetermined standard new calendar image including a prepared standard picture, the flow then going to step S290. If it is determined in step S276 that the stored data relating to this month is a composed calendar data, the flow directly goes to step S290 since there is no need of composing a calendar in electronic paper display 4.

In step S294, which follows step S290, output administration process is carried out for facilitating information transmission from electronic paper display 4 to digital camera 2, the details of which will be explained later. By the way, if it is determined in step S272 that the flow has not been started at the beginning of the next month, the flow directly goes to step S294. In step S296, which follows step S294, electronic paper display 4 is set to a standby state for responding to various types of above mentioned trigger to start the flowchart in FIG. 15. Further in step S298, electronic paper display 4 is switched from the active mode to the power-save mode, the flow is then ended.

Figure 16:
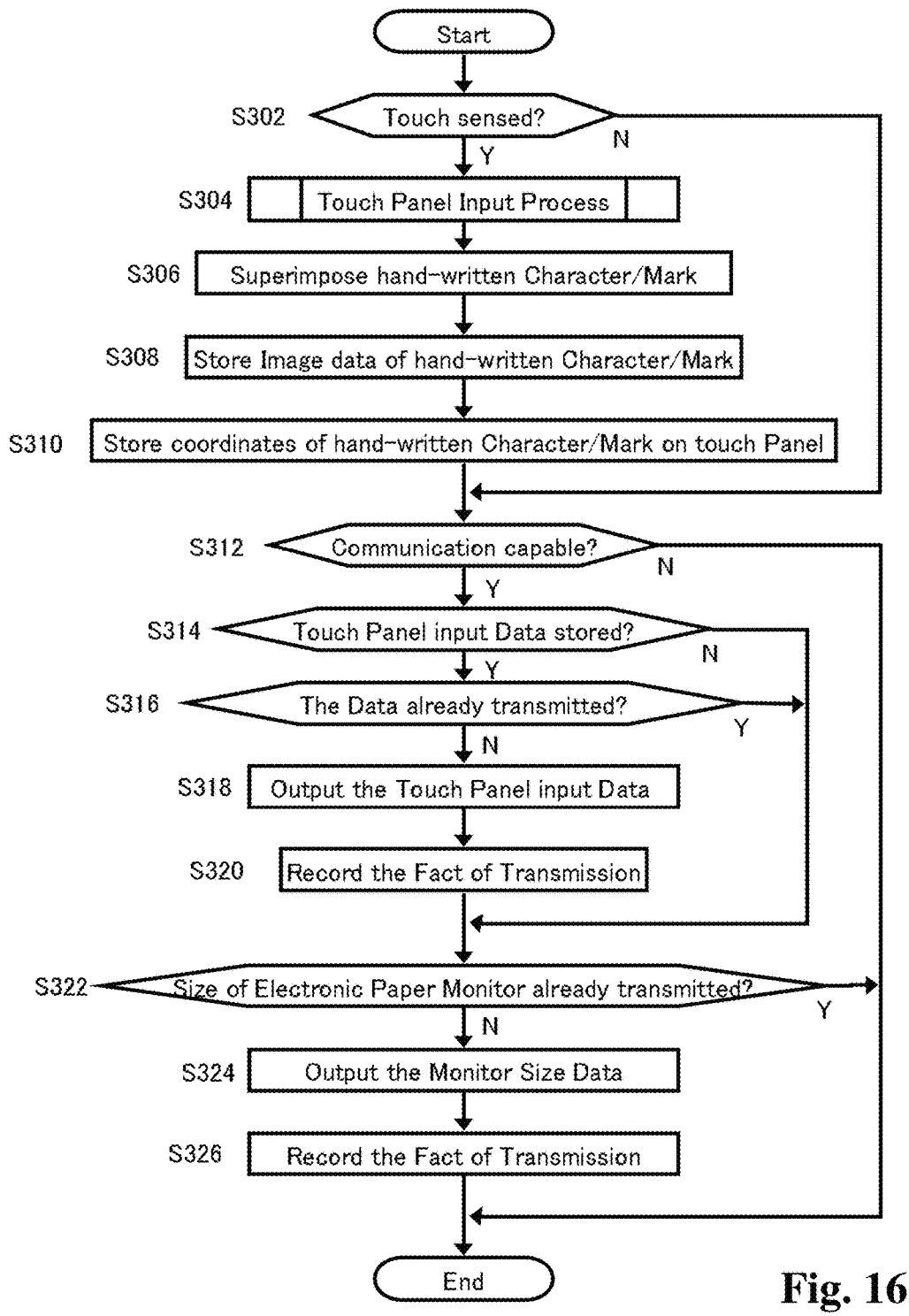
FIG. 16 is a flowchart showing the detailed function of step S294 in FIG. 15.

FIG. 16 is a flowchart showing the detailed function of the output administration process in step S294 in FIG. 15. If the flow starts, it is checked in step S302 whether or not touch panel 56 senses any touch thereto. If any, the flow advances to step S304 to carry out touch panel input process to input hand-written character or mark by tracing the change in the touched point on touch panel 56. Next in step S306, the input hand-written character or mark is superimposed on calendar image on electronic paper monitor 6. Thus, character or mark can be hand-written on the calendar image as if it is written on a real paper. Further, image data of the input hand-written character or mark is stored in step S308, and coordinates of hand-written character of mark on touch Panel are stored in step S310, the flow then going to step S312. On the other hand, if no touch is sensed in step S302, the flow directly goes to step S312.

In step S312, it is checked whether or not electronic paper display 4 is in a condition capable of communicating with digital camera 2 in response to the operation to initiate communication with digital camera 2 by way of display I/O 22 such as insertion of removable card storage 20 into card slot 24, or insertion of a cable into cable I/O 30, or a manual operation to initiate wireless communication by wireless I/O 32. If the communication is capable, the flow goes from step S312 to step S314 to check whether or not the hand-written touch panel input data is stored. If the touch panel data is stored, the flow goes from step S314 to step S316 to check whether or not the stored hand-written touch panel input data has been already transmitted to digital camera 2. If not, the flow goes from step S316 to step S318 to output the stored hand-written touch panel input data for transmission. The fact of transmission of the hand-written touch panel input data is recorded in the succeeding step S320, the flow then going to step S322. On the other hand, if it is not confirmed in step S314 that the hand-written touch panel input data is stored, the flow directly goes to step S322. Further, if it is confirmed in step S316 that the stored hand-written touch panel input data has been already transmitted to digital camera 2, the flow directly goes to step S322.

In step S322, it is checked whether or not the size of electronic paper monitor 6 has been output for transmission to digital camera 2. If not, the flow goes to step S324 to output the monitor size data of electronic paper monitor 6. The fact of transmission of the monitor size data is recorded in the succeeding step S326, the flow then going to the end. On the other hand, if it is confirmed in step S322 that the monitor size data has been already transmitted to digital camera 2, the flow directly goes to the end The flows in FIG. 15 and FIG. 16 are explained as the function of electronic paper display 4. However, the explained functions and the advantages thereof are not limited to the electronic paper type display, but are widely applicable to other various types of display devices, such as liquid crystal display device or organic electroluminescence display device. Further, the explained functions and the advantages are applicable not only display devices, but also other various image visualizing device including digital photo frame and digital printer.

The explained functions and the advantages according to this invention are applicable not only the cooperation between a digital camera and electronic paper display, but also other various combination between image capture device and image visualizing device such as mobile phone with camera incorporated and television set capable of receiving digital still image data.

What is claimed is:

1. An image output device capable of cooperating with a plurality of outside image visualizing devices for visualizing a picture, the plurality of outside image visualizing devices including a first type of image visualizing device necessitating a specific edition of image data for visualizing the picture and not relying on the image output device to generate the specific edition prior to transmission, but carrying out the specific edition by itself after transmission, wherein the specific edition of image data includes image data composed into a calendar, comprising:
    an image pickup arranged to pick up a picture as digital image data;
    a first storage arranged to store the digital image data of the picture;
    a second storage arranged to store a plurality of identifications of the plurality of outside image visualizing devices for outputting the digital image data to be transmitted to the outside image visualizing devices;
    a controller arranged to confirm one of the identifications of the plurality of outside image visualizing devices stored in the second storage;
    an output portion arranged to output the digital image data stored in the first storage and to transmit the same to the one of the plurality of outside image visualizing devices in response to the identification thereof confirmed by the controller, wherein the output portion is arranged to output the digital image data without the specific edition if the controller confirms the identification of the first type of image visualizing device, and wherein the output portion is arranged to output the digital image data with the specific edition if the controller confirms an identification of a second type of image visualizing device necessitating the specific edition of image data but not capable of producing the specific edition of image data; and
    a monitor arranged to monitor the picture of the digital image data to be transmitted from the output portion to the one of the plurality of the outside image visualizing devices.

2. The image output device according to claim 1, wherein the controller is further arranged to have the output portion change the digital image data to be transmitted to the outside image visualizing device in response to the identification thereof confirmed by the controller.

3. The image output device according to claim 1, wherein the controller is further arranged to have the second storage newly store a new identification of a new outside image visualizing device if the new identification is not confirmed in the second storage.

4. The image output device according to claim 1, wherein the second storage is arranged to store a plurality of identifications corresponding to a plurality of outside image visualizing devices, and wherein the output portion is arranged to transmit the digital image data stored in the first storage to a selected one of the outside image visualizing devices in accordance with a corresponding one of the identifications selectively confirmed by the controller.

5. The image output device according to claim 4, wherein the plurality of outside image visualizing devices includes at least one of an electronic paper display, a digital photo frame, digital printer and a television set.

6. The image output device according to claim 1, wherein the image output device is a mobile phone.

7. The image output device according to claim 1, wherein the image output device is capable of cooperating with a plurality of outside image visualizing devices of different types, and wherein the controller is further arranged to confirm at least one of the different types of the plurality of outside image visualizing devices.

8. The image output device according to claim 7, wherein the different types of the outside image visualizing devices include the first type not relying on the image output device for editing the image data prior to transmission and the second type relying on the image output device for editing the image data prior to transmission.

9. The image output device according to claim 1 further comprising an image editor arranged to edit the digital image data from the first storage according to the picture of the digital image data on the monitor, wherein the controller is further arranged to determine whether or not to have the image editor edit the digital image data to be transmitted to the outside image visualizing device in response to the identification thereof confirmed by the controller.

10. The image output device according to claim 9, wherein the outside image visualizing device is one of the first type not relying on the image output device for editing the image data and the second type relying on the image output device for editing the image data, wherein the controller is arranged to have the image editor edit the digital image data for the second type of the outside image visualizing device and not to have the image editor edit the digital image data for the first type of the outside image visualizing device in response to the identification thereof confirmed by the controller.

11. An image output device capable of cooperating with a plurality of outside image visualizing devices for visualizing a picture, the plurality of outside image visualizing devices including a first type of image visualizing device necessitating a specific edition of image data for visualizing the picture and not relying on the image output device to generate the specific edition prior to transmission, but carrying out the specific edition by itself after transmission, wherein the specific edition of image data includes image data composed into a calendar, comprising:
   an image pickup arranged to pick up a picture as digital image data;
   a first storage arranged to store the digital image data of the picture;
   a second storage arranged to store a plurality of identifications corresponding to the plurality of outside image visualizing devices for outputting the digital image data to be transmitted to the outside image visualizing devices;
   an output portion arranged to transmit the digital image data stored in the first storage to one of the outside image visualizing devices; and
   a controller arranged to control the output portion for changing the one of the outside image visualizing devices to which the digital image data is transmitted in response to a designation among the identifications stored in the second storage, wherein the output portion is arranged to output the digital image data without the specific edition if the identification of the first type of image visualizing device is designated, and wherein the output portion is arranged to output the digital image data with the specific edition if the identification of a second type of image visualizing device necessitating the specific edition of image data but not capable of producing the specific edition of image data is designated.

12. The image output device according to claim 11, wherein the controller is arranged to designate one of the plurality of identifications for controlling the output portion to select one of the outside image visualizing devices to which the digital image data is transmitted in response to the designation by the controller among the identifications.

13. The image output device according to claim 11, wherein the plurality of outside image visualizing devices include at least one of an electronic paper display, a digital photo frame, digital printer and a television set.

14. The image output device according to claim 11, wherein the image output device is a mobile phone.

15. The image output device according to claim 11, wherein the controller is further arranged to confirm one of types of a plurality of outside image visualizing devices.

16. The image output device according to claim 11, wherein the controller is further arranged to have the output portion change the digital image data to be transmitted to the outside image visualizing device in response to the identification thereof.

17. The image output device according to claim 16 further comprising an image editor arranged to edit the digital image data from the first storage, wherein the controller is further arranged to determine whether or not to have the image editor edit the digital image data to be transmitted to the outside image visualizing device in response to the identification.

18. The image output device according to claim 17, wherein the outside image visualizing device is one of the first type not relying on the image output device for editing the image data and the second type relying on the image output device for editing the image data, wherein the controller is arranged to have the image editor edit the digital image data for the second type of the outside image visualizing device and not to have the image editor edit the digital image data for the first type of the outside image visualizing device in response to the identification thereof.

19. An image output device capable of cooperating with a plurality of outside image visualizing devices for visualizing a picture, the plurality of outside image visualizing devices including a first type of image visualizing device necessitating a specific edition of image data for visualizing the picture and not relying on the image output device to generate the specific edition prior to transmission, but carrying out the specific edition by itself after transmission, wherein the specific edition of image data includes image data composed into a calendar, comprising:
   an image pickup arranged to pick up a picture as digital image data;
   a first storage arranged to store the digital image data of the picture;
   a second storage arranged to store a plurality of identifications of the plurality of outside image visualizing devices for outputting the digital image data to be transmitted to the outside image visualizing devices;
   an output portion arranged to transmit the digital image data stored in the first storage to one of the plurality of outside image visualizing devices in response to the identification thereof, wherein the output portion is arranged to output the digital image data without the specific edition if the first type of image visualizing device is identified, and wherein the output portion is arranged to output the digital image data with the specific edition if a second type of image visualizing device necessitating the specific edition of image data but not capable of producing the specific edition of image data is identified; and
   a controller arranged to have the second storage newly store a new identification of a new outside image visualizing device for outputting the digital image data to be transmitted to the outside image visualizing device if the new identification is not confirmed in the second storage.

20. The image output device according to claim 19, wherein the controller is further arranged to communicate with the outside image visualizing device and to confirm whether or not the identification of the outside image visualizing device for outputting the digital image data is stored in the second storage in accordance with the communication with the outside image visualizing device.

* * * * *